United States Patent
Okuike

(10) Patent No.: US 11,710,291 B2
(45) Date of Patent: Jul. 25, 2023

(54) IMAGE RECOGNITION DEVICE AND IMAGE RECOGNITION METHOD

(71) Applicant: Sony Semiconductor Solutions Corporation, Kanagawa (JP)

(72) Inventor: Kazuyuki Okuike, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/608,254

(22) PCT Filed: Apr. 28, 2020

(86) PCT No.: PCT/JP2020/018198
§ 371 (c)(1),
(2) Date: Nov. 2, 2021

(87) PCT Pub. No.: WO2020/230636
PCT Pub. Date: Nov. 19, 2020

(65) Prior Publication Data
US 2022/0207850 A1   Jun. 30, 2022

(30) Foreign Application Priority Data

May 10, 2019   (JP) .................................. 2019-089917

(51) Int. Cl.
*G06V 10/147* (2022.01)
*G06V 20/58* (2022.01)
*H04N 25/57* (2023.01)

(52) U.S. Cl.
CPC .......... *G06V 10/147* (2022.01); *G06V 20/584* (2022.01); *H04N 25/57* (2023.01)

(58) Field of Classification Search
None
See application file for complete search history.

(56) References Cited

U.S. PATENT DOCUMENTS 10,666,881 B2 *  5/2020  Kaneko ............... H04N 5/35563
10,855,940 B2 * 12/2020  Matsumoto ............ H04N 5/379
(Continued)

FOREIGN PATENT DOCUMENTS

CN       109073858 A  * 12/2018  ............... B60R 1/00
JP       2014-103643 A    6/2014
(Continued)

OTHER PUBLICATIONS

English translation for WO 2017051722 A1 Kaneko et al, Mar. 2017 (Year: 2017).*

(Continued)

*Primary Examiner* — James M Hannett
(74) *Attorney, Agent, or Firm* — Michael Best & Friedrich LLP

(57) ABSTRACT

An image recognition device (image recognition system 100) according to the present disclosure includes an imaging unit (10) and a recognition unit (14). The imaging unit (10) captures a plurality of images at the same exposure start timing in one frame period by using imaging pixels having different sensitivities to generate image data. The recognition unit (14) recognizes a subject from each of the image data. The imaging unit (10) includes a pixel array in which a plurality of imaging pixels having different exposure times, different light transmittances of color filters, or different light receiving areas are two-dimensionally arranged.

19 Claims, 19 Drawing Sheets

(56) References Cited

U.S. PATENT DOCUMENTS

| | | | |
|---|---|---|---|
| 2012/0050074 A1 | 3/2012 | Bechtel et al. | |
| 2014/0075195 A1 | 3/2014 | Kobayashi et al. | |
| 2018/0124335 A1* | 5/2018 | Machida | H04N 5/3745 |
| 2018/0146148 A1* | 5/2018 | Kaneko | H04N 5/37457 |
| 2018/0316898 A1* | 11/2018 | Kaneko | H04N 9/0451 |
| 2019/0028722 A1* | 1/2019 | Choi | G06T 3/4015 |
| 2019/0124277 A1 | 4/2019 | Mabuchi | |

FOREIGN PATENT DOCUMENTS

| | | | | |
|---|---|---|---|---|
| JP | 2017-55350 A | 3/2017 | | |
| JP | 2018-92610 A | 6/2018 | | |
| WO | WO-2013033480 A1 * | 3/2013 | | H04N 5/232 |
| WO | WO-2017051722 A1 * | 3/2017 | | H01L 27/146 |
| WO | 2017/187811 A1 | 11/2017 | | |
| WO | 2018/105474 A1 | 6/2018 | | |

OTHER PUBLICATIONS

English translation for CN 109073858 A, Akabane et al, Dec. 2017 (Year: 2017).*

International Search Report (PCT/ISA/210), International Application No. PCT/JP2020/018198, dated Jul. 21, 2020.

* cited by examiner

HIGH-SENSITIVITY IMAGING PIXEL
R Gb Gr B

Gb R B Gr
LOW-SENSITIVITY IMAGING PIXEL

LOW-SENSITIVITY IMAGING PIXEL
R Gb Gr B

Gb R B Gr
HIGH-SENSITIVITY IMAGING PIXEL

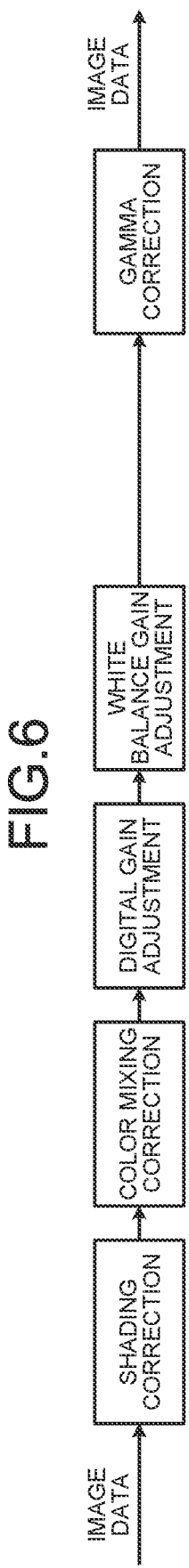

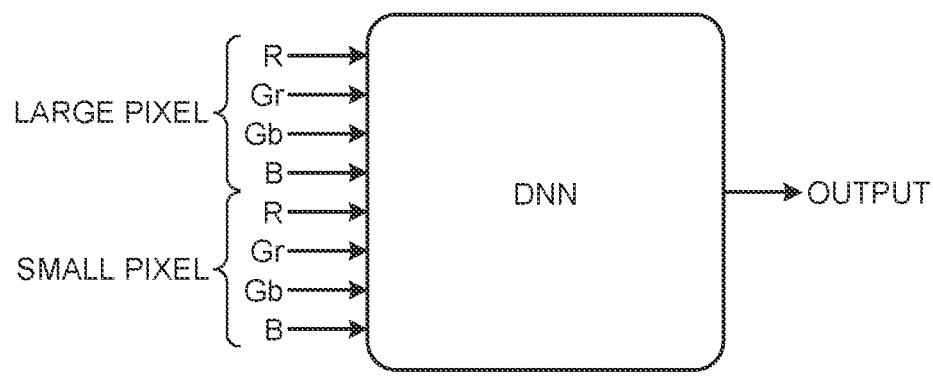
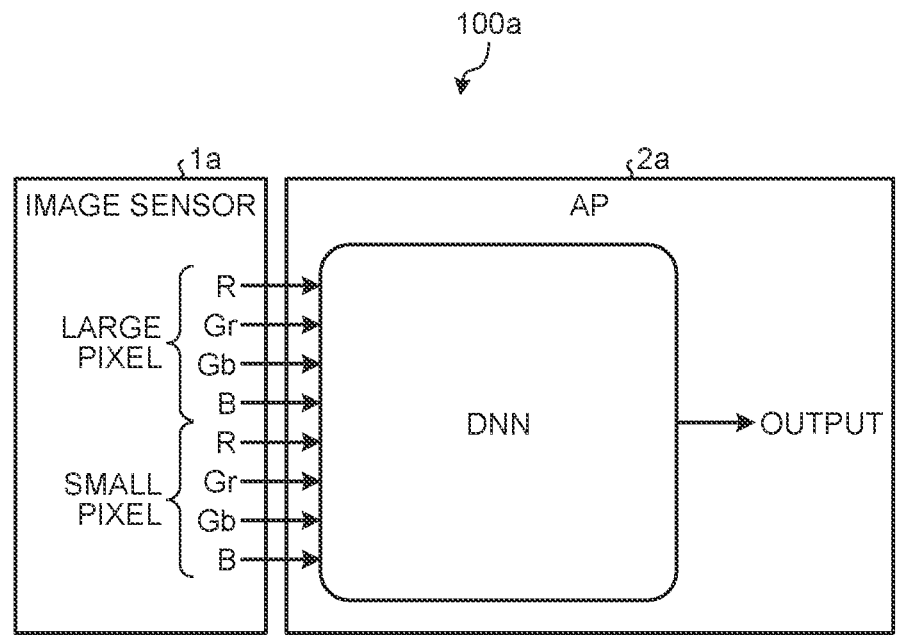

FIG.9
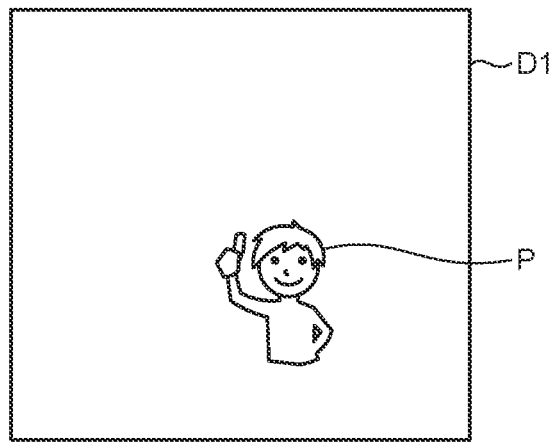
(FULL-SIZE IMAGE)
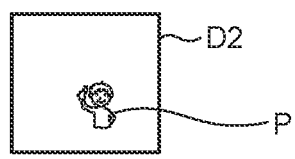
(FIRST DNN INPUT IMAGE)
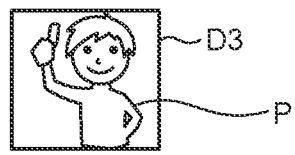
(SECOND DNN INPUT IMAGE)

FIG.11
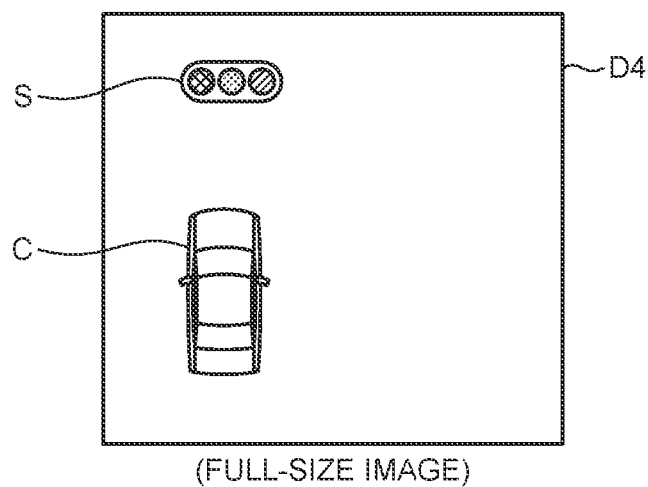
(FULL-SIZE IMAGE)
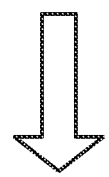
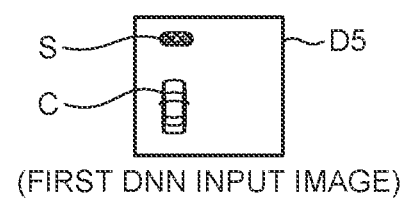
(FIRST DNN INPUT IMAGE)
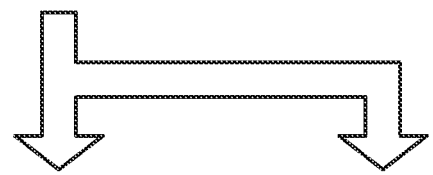
(SECOND DNN INPUT IMAGE)
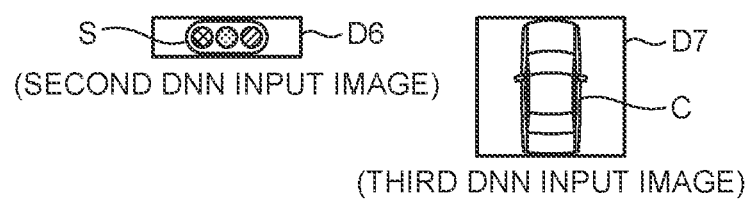
(THIRD DNN INPUT IMAGE)

1

IMAGE RECOGNITION DEVICE AND IMAGE RECOGNITION METHOD

FIELD

The present disclosure relates to an image recognition device and an image recognition method.

BACKGROUND

There is an imaging device that includes a high dynamic range (HDR) imaging mode for generating an HDR image by capturing and combining a plurality of images having different sensitivities in one frame period, and recognizes a subject from the HDR image (see, for example, Patent Literature 1).

CITATION LIST

Patent Literature

Patent Literature 1: JP 2014-103643 A

SUMMARY

Technical Problem

However, in the above-described technology according to the related art, the accuracy in recognizing the subject may be deteriorated. Therefore, the present disclosure proposes an image recognition device and an image recognition method capable of improving accuracy in recognizing a subject.

Solution to Problem

An image recognition device according to the present disclosure includes an imaging unit and a recognition unit. The imaging unit captures a plurality of images at the same exposure start timing in one frame period by using imaging pixels having different sensitivities to generate image data. The recognition unit recognizes a subject from each of the image data.

BRIEF DESCRIPTION OF DRAWINGS

FIG. 6 is an explanatory diagram illustrating a first modification of the processing executed by the signal processing unit according to the first embodiment of the present disclosure.

FIG. 7 is an explanatory diagram illustrating a modification of the usage example of the DNN according to the first embodiment of the present disclosure.

FIG. 8 is an explanatory diagram illustrating a modification of the image recognition system according to the first embodiment of the present disclosure.

FIG. 9 is an explanatory diagram illustrating a first operation example of an image sensor according to the first embodiment of the present disclosure.

FIG. 11 is an explanatory diagram illustrating a second operation example of the image sensor according to the first embodiment of the present disclosure.

DESCRIPTION OF EMBODIMENTS

Hereinafter, embodiments of the present disclosure will be described in detail with reference to the drawings. Note that, in each of the following embodiments, the same reference signs denote the same portions, and an overlapping description will be omitted.

1. First Embodiment

[1-1. Overview of Image Recognition Method According to First Embodiment]

First, an overview of an image recognition method according to the present disclosure will be described. In the image recognition method according to the present disclosure, a plurality of images are captured at the same exposure start timing in one frame period by using imaging pixels having different sensitivities to generate image data, and a subject is recognized from each of the image data.

Figure 1A:
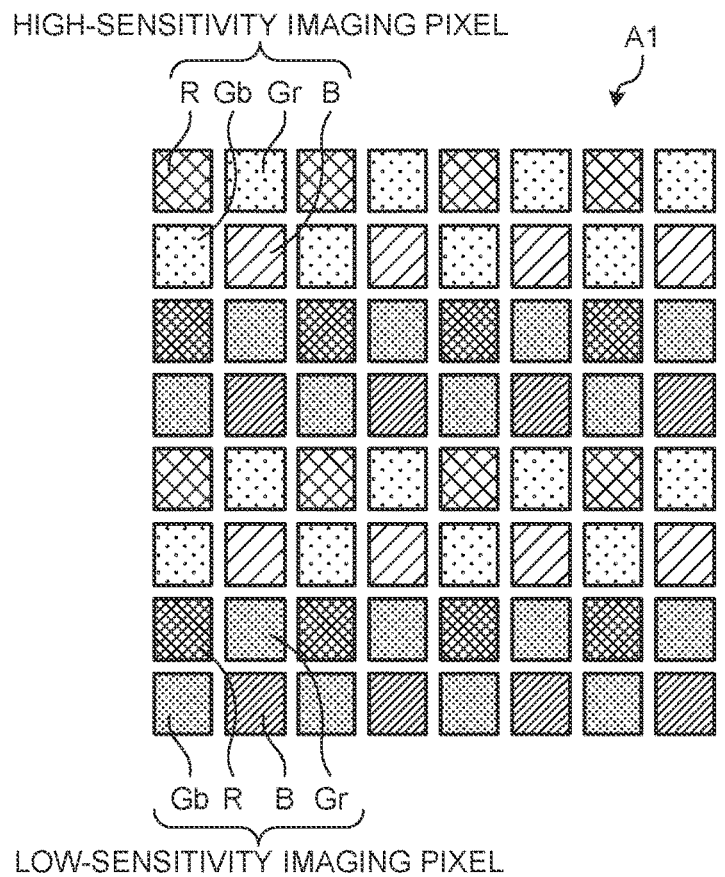
FIG. 1A is an explanatory diagram illustrating a pixel array according to a first embodiment of the present disclosure.

A pixel array used for capturing a high dynamic range (HDR) image is used for capturing the plurality of images. FIG. 1A is an explanatory diagram illustrating a pixel array according to a first embodiment of the present disclosure. For example, as illustrated in FIG. 1A, in a pixel array A1 used for capturing an HDR image, two rows of high-sensitivity imaging pixels and two rows of low-sensitivity imaging pixels are alternately two-dimensionally arranged.

In a region where the high-sensitivity imaging pixels and the low-sensitivity imaging pixels are arranged, imaging pixels R that receive red light, imaging pixels Gr and Gb that receive green light, and imaging pixels B that receive blue light are arranged in a Bayer array. Note that, in the following description, signals according to the amounts of received light output from the imaging pixels R, Gr, Gb, and B may be referred to as signals R, Gr, Gb, and B or pixel signals R, Gr, Gb, and B.

Note that the imaging pixel Gr is an imaging pixel that is provided in a row in which the imaging pixel R is arranged and receives green light. The imaging pixel Gb is an imaging pixel that is provided in a row in which the imaging pixel B is arranged and receives green light. The high-sensitivity imaging pixel and the low-sensitivity imaging pixel have the same light receiving area, and exposure of the high-sensitivity imaging pixel and exposure of the low-sensitivity imaging pixel start at the same time, but exposure times thereof are different.

Here, the high-sensitivity imaging pixel is an imaging pixel having a longer exposure time than usual, and can obtain a sufficient amount of received light even when the surroundings are dark. As a result, the high-sensitivity imaging pixel can capture a high-sensitivity image in which an image of a subject is clearly captured even in a case where luminance is excessively low and the subject is underexposed in a normal exposure time.

Furthermore, the low-sensitivity imaging pixel here is an imaging pixel having a shorter exposure time than usual, and is not saturated even when the surroundings are bright. As a result, the low-sensitivity imaging pixel can capture a low-sensitivity image in which an image of a subject is clearly captured even in a case where the luminance is excessively high and the subject is overexposed in a normal exposure time.

The HDR image is generated by HDR-combining the high-sensitivity image and the low-sensitivity image. Therefore, the HDR image is an image in which images of all subjects including both a dark subject and a bright subject are clearly captured.

Note that, in the pixel array A1 illustrated in FIG. 1A, imaging pixels having the same light receiving area are caused to function as the high-sensitivity imaging pixels or low-sensitivity imaging pixels by varying the exposure time, but this is an example. For example, the pixel array A1 can cause each imaging pixel to function as the high-sensitivity imaging pixel or low-sensitivity imaging pixel even when the exposure time is the same by varying the light transmittance of a color filter stacked on each imaging pixel.

In this case, in the pixel array A1, an imaging pixel on which the color filter having a high light transmittance is stacked is the high-sensitivity imaging pixel, and an imaging pixel on which the color filter having a low light transmittance is stacked is the low-sensitivity imaging pixel. Since the pixel array A1 can also capture the high-sensitivity image and the low-sensitivity image at the same time, it is possible to capture the HDR image by HDR-combining both images. Note that, in the pixel array A1, it is also possible to provide a moderate-sensitivity imaging pixel by adjusting the transparency of the color filter stacked on the imaging pixel.

Figure 1B:
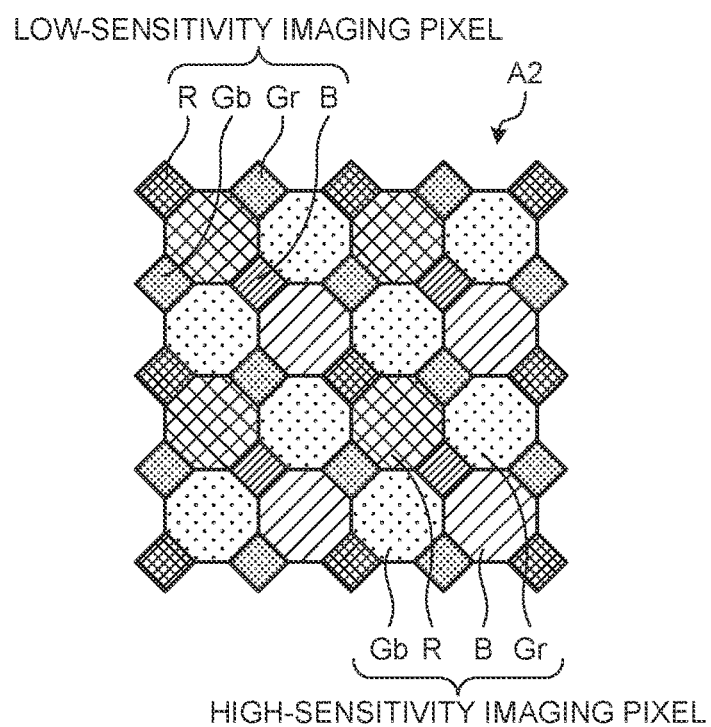
FIG. 1B is an explanatory diagram illustrating another pixel array according to the first embodiment of the present disclosure.

Furthermore, by varying the light receiving area of the imaging pixel, it is also possible to cause the imaging pixels having the same transparency of the color filter and the same exposure time to function as the high-sensitivity imaging pixels or low-sensitivity imaging pixels. FIG. 1B is an explanatory diagram illustrating another pixel array according to the first embodiment of the present disclosure.

As illustrated in FIG. 1B, a pixel array A2 includes imaging pixels R, Gr, Gb, and B that are arranged in a Bayer array and have a large light receiving area, and imaging pixels R, Gr, Gb, and B that are arranged at four corners of each of the imaging pixels R, Gr, Gb, and B having a large light receiving area and have a small light receiving area. The arrangement of each of the imaging pixels R, Gr, Gb, and B having a small light receiving area is the same as the Bayer array.

In the pixel array A2, in a case where the transparency of the color filter and the exposure time are the same, the amounts of received light of the imaging pixels R, Gr, Gb, and B having a large light receiving area are larger than the amounts of received light of the imaging pixels R, Gr, Gb, and B having a small light receiving area.

Therefore, the imaging pixels R, Gr, Gb, and B having a large light receiving area are the high-sensitivity imaging pixels, and the imaging pixels R, Gr, Gb, and B having a small light receiving area are the low-sensitivity imaging pixels. Since the pixel array A2 can also capture the high-sensitivity image and the low-sensitivity image, it is possible to capture the HDR by HDR-combining both images.

Here, examples of a method of recognizing a subject from image data include an image recognition method using a deep neural network (DNN). The DNN is an algorithm having a multilayer structure in which a human cranial nerve circuit (neural network) designed by machine learning so as to recognize a feature (pattern) of a subject from image data is used as a model.

Figure 2A:
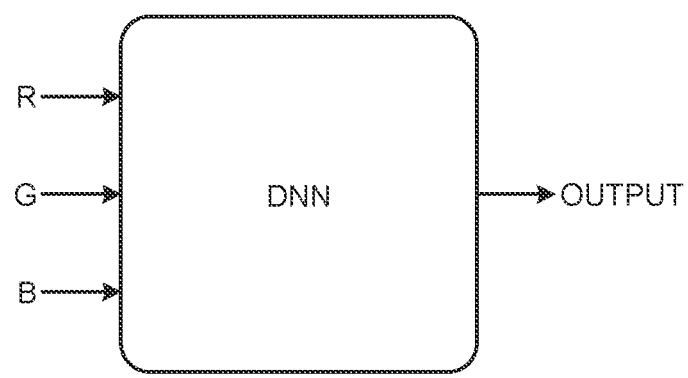
FIG. 2A is an explanatory diagram illustrating a usage example of a general DNN.

FIG. 2A is an explanatory diagram illustrating a usage example of a general DNN. For example, in a case of recognizing a subject from the HDR image, as illustrated in FIG. 2A, when signals R, G, and B (image data of the HDR image) of the respective pixels in the HDR image after HDR combination are input to the DNN, a subject recognition result is output from the DNN.

However, an artifact that does not actually exist may be included in the HDR image due to the HDR combination. Therefore, when the signals R, G, and B of the respective pixels in the HDR image are input to the DNN, accuracy in recognizing the subject by the DNN may be deteriorated due to the adverse effect of the artifact.

Figure 2B:
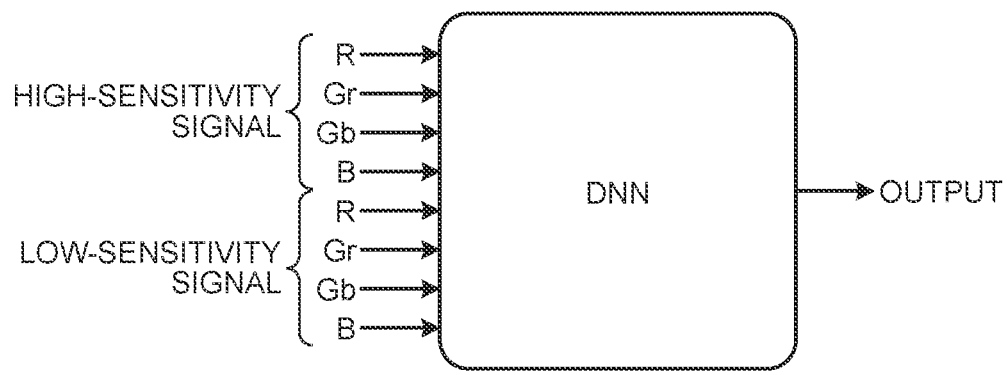
FIG. 2B is an explanatory diagram illustrating a usage example of a DNN according to the first embodiment of the present disclosure.

Therefore, in the present disclosure, by recognizing the subject from each of the high-sensitivity image and the low-sensitivity image before the HDR combination, the influence of the artifact is eliminated, and the accuracy in recognizing the subject is improved. FIG. 2B is an explanatory diagram illustrating a usage example of a DNN according to the first embodiment of the present disclosure.

As illustrated in FIG. 2B, in the present disclosure, for example, high-sensitivity signals R, Gr, Gb, and B (image data of the high-sensitivity image) output from the high-sensitivity imaging pixels and low-sensitivity signals R, Gr, Gb, and B (image data of the low-sensitivity image) output from the low-sensitivity imaging pixels are input to the DNN.

As a result, the DNN outputs the result of recognizing the subject from the high-sensitivity image and the result of recognizing the subject from the low-sensitivity image. At this time, since the DNN recognizes the subject from the high-sensitivity image and the low-sensitivity image that do not include the artifact, it is possible to output a highly accurate subject recognition result without being affected by the artifact.

As described above, in the image recognition method according to the present disclosure, a plurality of images are captured at the same exposure start timing in one frame period by using the imaging pixels having different sensitivities to generate image data, and a subject is recognized from each of the image data, thereby making it possible to improve the accuracy in recognizing the subject.

[1-2. Configuration of Image Recognition System According to First Embodiment]

Figure 3:
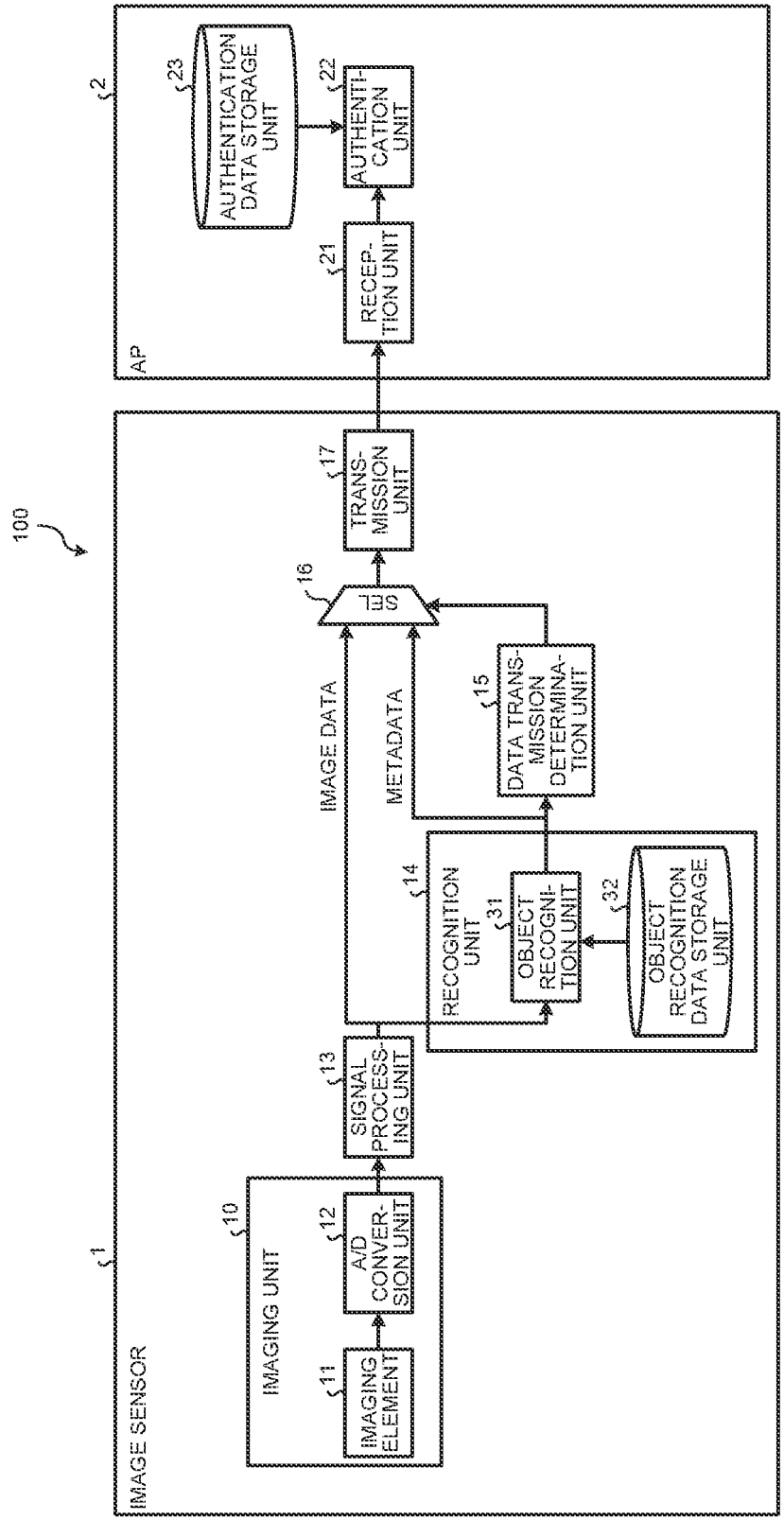
FIG. 3 is a diagram illustrating an example of a configuration of an image recognition system according to the first embodiment of the present disclosure.

Next, a configuration of the image recognition system according to the first embodiment will be described with reference to FIG. 3. FIG. 3 is a diagram illustrating an example of the configuration of the image recognition system according to the first embodiment of the present disclosure. As illustrated in FIG. 3, an image recognition system 100 according to the first embodiment includes an image sensor 1 which is an example of an image recognition device, and an application processor (hereinafter, referred to as AP 2).

The image sensor 1 includes an imaging unit 10, a signal processing unit 13, a recognition unit 14, a data transmission determination unit 15, a selector (hereinafter, referred to as SEL 16), and a transmission unit 17. The imaging unit 10 includes an imaging element 11 and an analog/digital (A/D) conversion unit 12.

The imaging element 11 includes, for example, the pixel array A2 illustrated in FIG. 1B. Note that the imaging element 11 may be the pixel array A1 including the imaging pixels having the same light receiving area and different exposure times illustrated in FIG. 1A, or may be a pixel array including the imaging pixels having the same light receiving area, the same exposure time, and different transparencies of the color filters stacked.

Hereinafter, the imaging pixel having a large light receiving area and included in the pixel array A2 may be referred to as a large pixel, and the imaging pixel having a small light receiving area may be referred to as a small pixel. The imaging element 11 exposes the large pixel and the small pixel at the same exposure start timing for the same exposure time, and simultaneously captures the high-sensitivity image and the low-sensitivity image.

Then, the imaging element 11 outputs an analog pixel signal corresponding to the amount of received light from each large pixel and each small pixel to the A/D conversion unit 12. The A/D conversion unit 12 A/D-converts the analog pixel signal input from the imaging element 11 into a digital pixel signal to generate the image data of the high-sensitivity image and the image data of the low-sensitivity image, and outputs the image data to the signal processing unit 13.

The signal processing unit 13 includes a microcomputer including a central processing unit (CPU), a read only memory (ROM), a random access memory (RAM), and the like, and various circuits.

The signal processing unit 13 executes predetermined signal processing on each of the image data of the high-sensitivity image and the image data of the low-sensitivity image input from the A/D conversion unit 12, and outputs the image data of the high-sensitivity image and the image data of the low-sensitivity image after the signal processing to the recognition unit 14 and the SEL 16.

Figure 4:
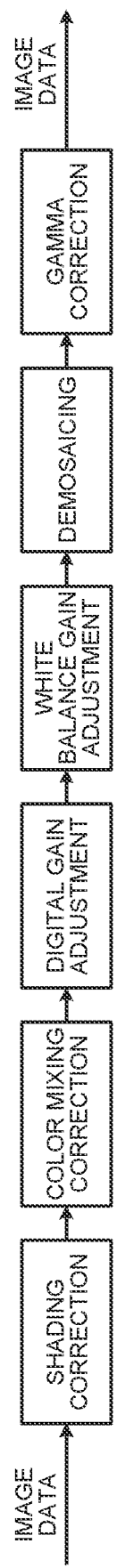
FIG. 4 is an explanatory diagram of processing executed by a signal processing unit according to the first embodiment of the present disclosure.

Here, a flow of the processing executed by the signal processing unit 13 will be described with reference to FIG. 4. FIG. 4 is an explanatory diagram of the processing executed by the signal processing unit according to the first embodiment of the present disclosure. As illustrated in FIG. 4, the signal processing unit 13 first performs shading correction on the input image data, and then performs color mixing correction.

Thereafter, the signal processing unit 13 performs digital gain adjustment on the image data, and then performs white balance gain adjustment. Thereafter, the signal processing unit 13 performs demosaicing on the image data and then finally performs gamma correction, and outputs the image data after the gamma correction.

Note that, in the demosaicing, processing of complementing the color of each pixel of the high-sensitivity image and the low-sensitivity image with the color of surrounding pixels is executed. Therefore, the image data of the high-sensitivity image and the low-sensitivity image before the demosaicing include four types of pixel signals R, Gr, Gb, and B, but the image data after the demosaicing include three types of pixel signals R, G, and B.

Referring back to FIG. 3, the recognition unit 14 includes a microcomputer including a CPU, a ROM, a RAM, and the like, and various circuits. The recognition unit 14 includes an object recognition unit 31 that functions in a manner in which the CPU executes an object recognition program stored in the ROM by using the RAM as a work area, and an object recognition data storage unit 32 provided in the RAM or the ROM.

The object recognition data storage unit 32 stores a plurality of DNNs. For example, the object recognition data storage unit 32 stores the DNN that recognizes an object from the image data of the high-sensitivity image and the DNN that recognizes an object from the image data of the low-sensitivity image. Note that the DNN for each type of object as a recognition target is stored in the object recognition data storage unit 32.

The object recognition unit 31 reads the DNN according to the set type of the recognition target from the object recognition data storage unit 32, inputs the image data to the DNN, outputs the subject recognition result output from the DNN to the data transmission determination unit 15, and outputs metadata of the recognition result to the SEL 16.

Figure 5A:
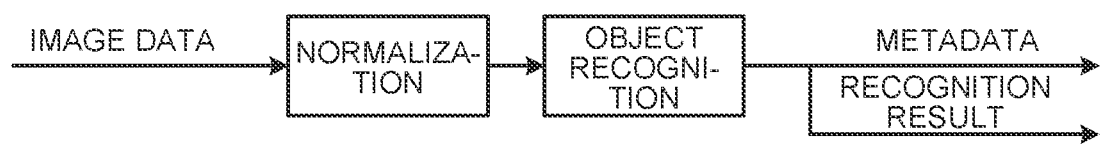
FIG. 5A is an explanatory diagram of processing executed by a recognition unit according to the first embodiment of the present disclosure.
Figure 5B:
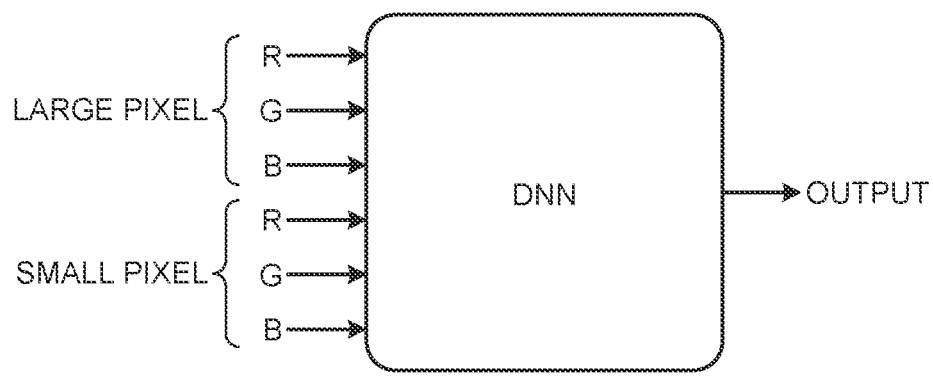
FIG. 5B is an explanatory diagram of the processing executed by the recognition unit according to the first embodiment of the present disclosure.

Here, a flow of the processing executed by the recognition unit 14 will be described with reference to FIGS. 5A and 5B. FIGS. 5A and 5B are explanatory diagrams of the processing executed by the recognition unit according to the first embodiment of the present disclosure. As illustrated in FIG. 5A, the recognition unit 14 first normalizes the size and input value of the input image data in accordance with the size and input value for the DNN, and inputs the normalized image data to the DNN to perform object recognition. Then, the recognition unit 14 outputs the subject recognition result output from the DNN to the data transmission determination unit 15, and outputs the metadata of the recognition result to the SEL 16.

At this time, as illustrated in FIG. 5B, the recognition unit 14 inputs the pixel signals R, G, and B of the large pixels and the pixel signals R, G, and B of the small pixels to the DNN. As a result, the recognition unit 14 can recognize the subject from each of the high-sensitivity image and the low-sensitivity image that do not include the artifact, thereby improving the accuracy in recognizing the subject.

Referring back to FIG. 3, the data transmission determination unit 15 outputs a control signal for switching data to be output from the SEL 16 to the SEL 16 according to the recognition result input from the recognition unit 14. In a case where the subject has been recognized by the recognition unit 14, the data transmission determination unit 15 outputs, to the SEL 16, a control signal for outputting the image data and the metadata indicating the recognition result to the transmission unit 17.

Furthermore, in a case where the subject has not been recognized by the recognition unit 14, the data transmission determination unit 15 outputs, to the SEL 16, a control signal for outputting information indicating that the subject has not been recognized (no data) to the transmission unit 17. The SEL 16 outputs any one of a set of the image data and the metadata or the information indicating that there is no data to the transmission unit 17 according to the control signal input from the data transmission determination unit 15.

The transmission unit 17 is a communication interface (I/F) that performs data communication with the AP 2, and transmits any one of a set of the image data and the metadata input from the SEL 16 or the information indicating that there is no data to the AP 2.

The AP 2 includes a microcomputer that executes various application programs according to the application of the image recognition system 100 and includes a CPU, a ROM, a RAM, and the like, and various circuits. The AP 2 includes a reception unit 21, an authentication unit 22, and an authentication data storage unit 23.

The authentication data storage unit 23 stores an authentication program for authenticating the subject recognized by the image sensor 1, authentication image data, and the like. The reception unit 21 is a communication I/F that performs data communication with the image sensor 1. The reception unit 21 receives any one of a set of the image data and the metadata or the information indicating that there is no data from the image sensor 1 and outputs the same to the authentication unit 22.

The authentication unit 22 is not activated when the information indicating that there is no data is input from the reception unit 21, but is activated when a set of the image data and the metadata is input. Once activated, the authentication unit 22 reads the authentication program from the authentication data storage unit 23 and executes the authentication program, and authenticates the subject recognized by the image sensor 1.

For example, in a case where a set of the metadata and the image data indicating that the subject is a person is input, the authentication unit 22 executes processing of collating the image data with the image data for authentication of a person and identifying the recognized person.

At this time, the authentication unit 22 identifies the person based on the image data of the high-sensitivity image and the low-sensitivity image which are not affected by the artifact and from which the subject is recognized as a person by the image sensor 1 with high accuracy, such that it is possible to accurately identify the recognized person. Note that the first embodiment described above is an example, and various modifications are possible. Next, a modification according to the first embodiment will be described.

[1-3. Modification of Image Sensor According to First Embodiment]

FIG. 6 is an explanatory diagram illustrating a modification of the processing executed by the signal processing unit according to the first embodiment of the present disclosure. FIG. 7 is an explanatory diagram illustrating a modification of the usage example of the DNN according to the first embodiment of the present disclosure.

As illustrated in FIG. 6, the signal processing unit according to the modification performs shading correction, color mixing correction, digital gain adjustment, white balance gain adjustment, and gamma correction on the input image data, and outputs the image data after the signal processing to the recognition unit 14 and the SEL 16.

In this manner, the signal processing unit can omit the demosaicing in the signal processing illustrated in FIG. 4. In this case, the recognition unit 14 recognizes the subject from the image data that are not subjected to the demosaicing. As described above, the image data of the high-sensitivity image and the low-sensitivity image that are not subjected to the demosaicing include four types of pixel signals R, Gr, Gb, and B.

Therefore, as illustrated in FIG. 7, the recognition unit 14 inputs the pixel signals R, Gr, Gb, and B of the large pixels and the pixel signals R, Gr, Gb, and B of the small pixels to the DNN. In such a case, the throughput of the recognition unit 14 increases since the number of input channels of the DNN increases, but since the image data of the high-sensitivity image and the low-sensitivity image are individually input to the DNN, the subject can be recognized with high accuracy without being affected by the artifact.

Note that, in another modification, the signal processing unit itself can be omitted. In such a case, similarly to the example illustrated in FIG. 7, since the recognition unit 14 inputs the pixel signals R, Gr, Gb, and B of the large pixels and the pixel signals R, Gr, Gb, and B of the small pixels to the DNN, the throughput increases, but the throughput of the entire image sensor 1 is greatly reduced by not performing the signal processing.

Note that, in the first embodiment, the data transmission determination unit 15 causes the SEL 16 to output the metadata of the recognition result and the image data every time when the subject is recognized, but may select data to be output from the SEL 16 according to a state of charge of a battery.

For example, in a case where the subject has been recognized by the recognition unit 14, the data transmission determination unit 15 causes the SEL 16 to output the metadata and the image data in a normal mode in which the state of charge of the battery is sufficient. Further, the data transmission determination unit 15 causes the SEL 16 to output only the metadata in a low power consumption mode in which the state of charge of the battery is insufficient. As a result, the data transmission determination unit 15 can suppress the power consumption of the image sensor 1 to be low when the state of charge of the battery is insufficient.

[1-4. Modification of Image Recognition System According to First Embodiment]

Next, a modification of the image recognition system according to the first embodiment will be described with reference to FIG. 8. FIG. 8 is an explanatory diagram illustrating the modification of the image recognition system according to the first embodiment of the present disclosure.

In the image recognition system 100 described above, the image sensor 1 recognizes the subject from the high-sensitivity image and the low-sensitivity image, but in an image recognition system 100a according to the modification, the high-sensitivity image and the low-sensitivity image are transmitted from an image sensor 1a to an AP 2a, and subject recognition is performed by the AP 2.

Specifically, as illustrated in FIG. 8, the image sensor 1a of the image recognition system 100a according to the modification captures the high-sensitivity image and the low-sensitivity image, and transmits the pixel signals R, Gr, Gb, and B of the large pixels and the pixel signals R, Gr, Gb, and B of the small pixels to the AP 2a.

The AP 2a of the image recognition system 100a includes a DNN, and inputs the pixel signals R, Gr, Gb, and B of the large pixels and the pixel signals R, Gr, Gb, and B of the small pixels received from the image sensor 1a to the DNN. As a result, the AP 2a can recognize the subject with high accuracy from the high-sensitivity image and the low-sensitivity image without being affected by the artifact.

[1-5. First Specific Example of Processing Executed by Image Sensor According to First Embodiment]

Next, a first specific example of processing executed by the image sensor according to the first embodiment will be described with reference to FIGS. 9 and 10.

Note that, here, it is assumed that the image sensor 1 includes the pixel array A1 in which the imaging pixels illustrated in FIG. 1A have the same light receiving area and different exposure times, and an imaging pixel having a long exposure time is referred to as a long-exposure pixel, and an imaging pixel having a short exposure time is referred to as a short-exposure pixel.

Furthermore, here, an overview of an operation in a case where the image sensor 1 recognizes a person from an image will be described with reference to FIG. 9, and then, the first specific example of the processing executed by the image sensor 1 will be described with reference to FIG. 10.

FIG. 9 is an explanatory diagram illustrating a first operation example of the image sensor according to the first embodiment of the present disclosure. FIG. 10 is a flowchart illustrating the first specific example of the processing executed by the image sensor according to the first embodiment of the present disclosure.

As illustrated in FIG. 9, the image sensor 1 first captures a full-size image D1 in which a person P is captured, and bins the full-size image D1 to generate a first DNN input image D2 having a resolution reduced to, for example, ¼.

Then, in a case where the image sensor 1 has recognized the person P from the first DNN input image D2, the image sensor 1 cuts out a portion of the person P from the full-size image D1 that is not subjected to the binning to generate a second DNN input image D3.

Figure 10:
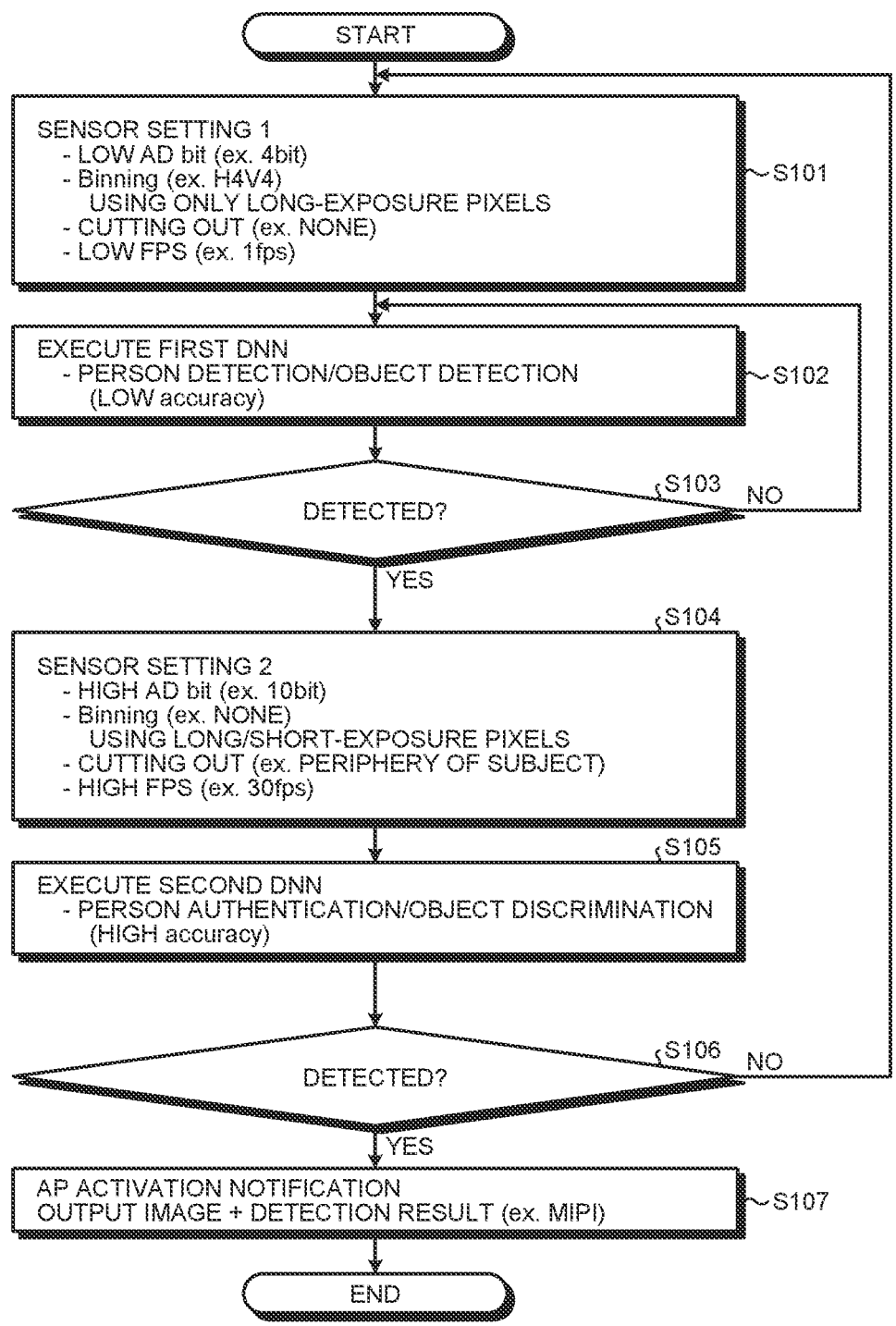
FIG. 10 is a flowchart illustrating a first specific example of processing executed by the image sensor according to the first embodiment of the present disclosure.

Specifically, as illustrated in FIG. 10, the image sensor 1 first generates image data of the first DNN input image D2 with sensor setting 1 (Step S101). Here, it is assumed that the sensor setting 1 includes low AD bit (e.g., 4 bits), binning (e.g., H4V4), using only long-exposure pixels, cutting out (e.g., none), and low FPS (e.g., 1 fps).

In this case, the image sensor 1 uses only the long-exposure pixels, captures the full-size image D1 at a frame rate of 1 fps, and analog-digital converts a pixel signal of the full-size image D1 with 4 bits. Thereafter, the image sensor 1 reduces the resolution of the full-size image D1 to ¼ by binning, and generates the first DNN input image D2 without cutting out the image.

Subsequently, the image sensor 1 inputs the image data of the first DNN input image D2 to the DNN and executes a first DNN (Step S102). At this time, the image sensor 1 detects a person or an object with low accuracy. Thereafter, the image sensor 1 determines whether a person or an object has been detected (Step S103).

Then, in a case where the image sensor 1 determines that a person or an object has not been detected (Step S103, No), the processing proceeds to Step S102. In addition, in a case where the image sensor 1 determines that a person or an object has been detected (Step S103, Yes), the processing proceeds to Step S104.

In Step S104, the image sensor 1 generates image data of the second DNN input image D3 with sensor setting 2. Here, it is assumed that the sensor setting 2 includes high AD bit (e.g., 10 bits), binning (e.g., none), using long/short-exposure pixels, cutting out (e.g., the periphery of the subject), and high FPS (e.g., 30 fps).

In this case, the image sensor 1 uses the long-exposure pixels and the short-exposure pixels, captures the full-size image D1 at a frame rate of 30 fps, and analog-digital converts the pixel signal of the full-size image D1 with 10 bits. Thereafter, the image sensor 1 cuts out a portion in the periphery of the subject from the full-size image D1 without reducing the resolution of the full-size image D1 to generate the second DNN input image D3.

Subsequently, the image sensor 1 inputs the image data of the second DNN input image D3 to the DNN and executes a second DNN (Step S105). At this time, the image sensor 1 performs person authentication or object discrimination with high accuracy. Thereafter, the image sensor 1 determines whether or not a person or an object that is a recognition target has been detected (Step S106).

Then, in a case where the image sensor 1 determines that a person or an object has not been detected (Step S106, No), the processing proceeds to Step S101. In a case where image sensor 1 determines that a person or an object has been detected (Step S106, Yes), the image sensor 1 makes an AP activation notification to the AP 2 (Step S107), and ends the processing. At this time, the image sensor 1 outputs the image data and the subject detection (recognition) result to the AP 2 by a communication method conforming to the mobile industry processor interface (MIPI) standard, for example.

[1-6. Second Specific Example of Processing Executed by Image Sensor According to First Embodiment]

Next, a second specific example of the processing executed by the image sensor according to the first embodiment will be described with reference to FIGS. 11 to 13.

Note that, here, it is also assumed that the image sensor 1 includes the pixel array A1 in which the imaging pixels illustrated in FIG. 1A have the same light receiving area and different exposure times, and an imaging pixel having a long exposure time is referred to as a long-exposure pixel, and an imaging pixel having a short exposure time is referred to as a short-exposure pixel.

Furthermore, here, an overview of an operation in a case where the image sensor 1 recognizes a preceding vehicle and a traffic light from an image will be described with reference to FIG. 11, the second specific example of the processing executed by the image sensor 1 will be described with reference to FIG. 12, and then, functions and effects of the second specific example will be described with reference to FIG. 13.

FIG. 11 is an explanatory diagram illustrating a second operation example of the image sensor according to the first embodiment of the present disclosure. FIG. 12 is a flowchart illustrating the second specific example of the processing executed by the image sensor 1 according to the first embodiment of the present disclosure. FIG. 13 is an explanatory diagram of functions and effects according to the second operation example of the image sensor according to the first embodiment of the present disclosure.

As illustrated in FIG. 11, the image sensor 1 first captures a full-size image D4 in which a preceding vehicle C and a traffic light S are captured, and generates a first DNN input image D5 without reducing the resolution of the full-size image D4 by binning.

Then, in a case where the image sensor 1 has recognized the traffic light S from the first DNN input image D5, the image sensor 1 cuts out a portion of the traffic light S from the full-size image D4 to generate a second DNN input image D6. Further, in a case where the image sensor 1 has recognized the preceding vehicle C from the first DNN input image D5, the image sensor 1 cuts out a portion of the preceding vehicle from the full-size image D4 to generate a third DNN input image D7.

Figure 12:
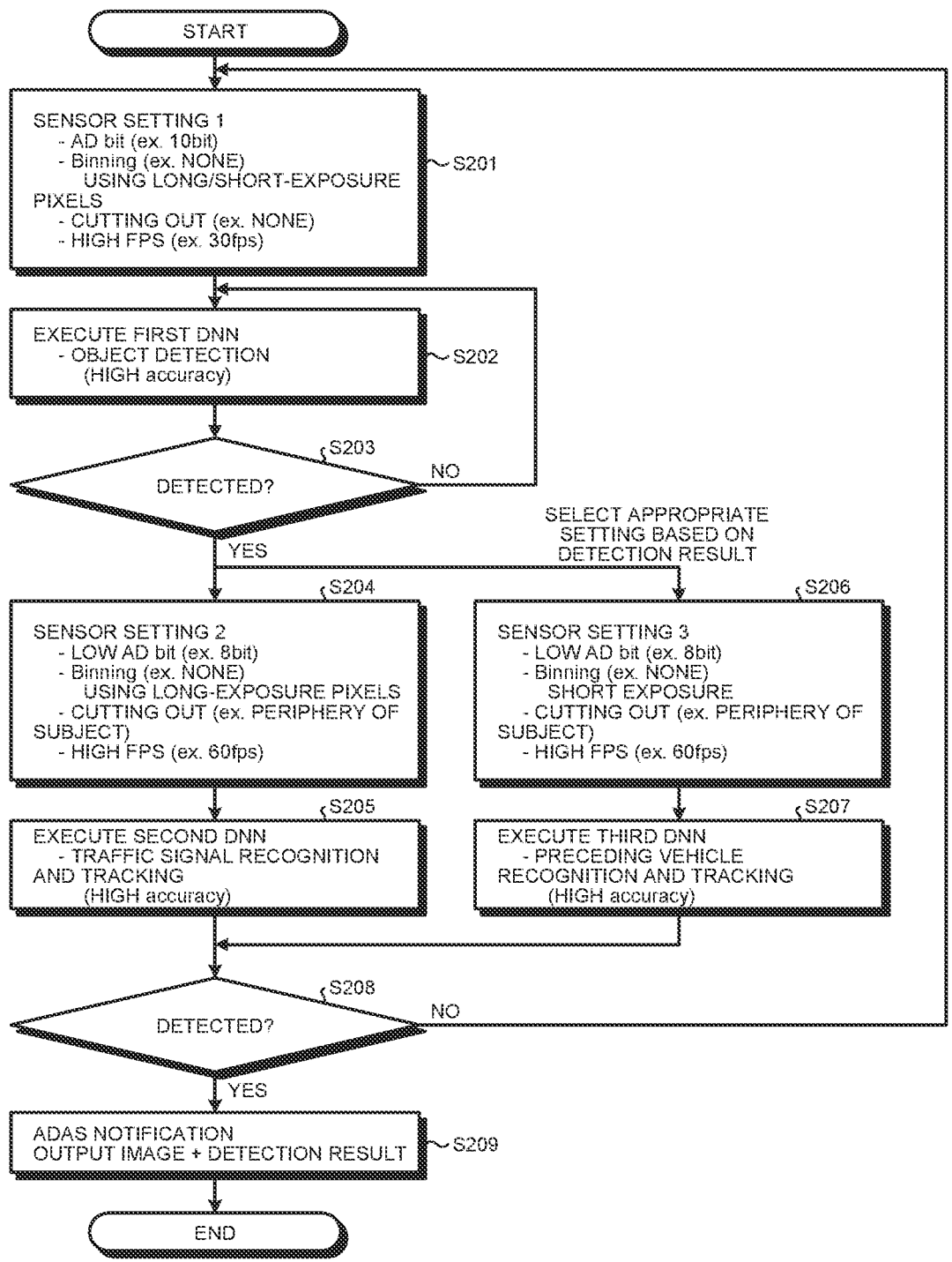
FIG. 12 is a flowchart illustrating a second specific example of the processing executed by the image sensor according to the first embodiment of the present disclosure.

Specifically, as illustrated in FIG. 12, the image sensor 1 first generates image data of the first DNN input image D5 with sensor setting 1 (Step S201). Here, it is assumed that the sensor setting 1 includes AD bit (e.g., 10 bits), binning (e.g., none), using long/short-exposure pixels, cutting out (e.g., none), and high FPS (e.g., 30 fps).

In this case, the image sensor 1 uses the long-exposure pixels and the short-exposure pixels, captures the full-size image D4 at a frame rate of 30 fps, and analog-digital converts the pixel signal of the full-size image D4 with 10 bits. Then, the image sensor 1 generates the first DNN input image D5 without reducing the resolution of the full-size image D4 and without cutting out the image.

Subsequently, the image sensor 1 inputs the image data of the first DNN input image D5 to the DNN and executes the first DNN (Step S202). At this time, the image sensor 1 detects an object with high accuracy. Thereafter, the image sensor 1 determines whether or not an object has been detected (Step S203).

Then, in a case where the image sensor 1 determines that an object has not been detected (Step S203, No), the processing proceeds to Step S202. Furthermore, in a case where the image sensor 1 determines that an object has been detected (Step S203, Yes), the image sensor 1 selects an appropriate setting based on the detection result.

For example, in a case where the image sensor 1 has detected (recognized) the traffic light S, the image sensor 1 generates image data of the second DNN input image D6 with sensor setting 2 (Step S204). Here, it is assumed that the sensor setting 2 includes low AD bit (e.g., 8 bits), binning (e.g., none), using long-exposure pixels, cutting out (e.g., the periphery of the subject), and high FPS (e.g., 60 fps).

In this case, the image sensor 1 uses the long-exposure pixels, captures the full-size image D4 at a frame rate of 60 fps, and analog-digital converts a pixel signal of the full-size image D4 with 8 bits. Thereafter, the image sensor 1 cuts out a portion in the periphery of the subject (traffic light S) from the full-size image D4 without reducing the resolution of full-size image D4 to generate the image data of the second DNN input image D6.

Subsequently, the image sensor 1 inputs the image data of the second DNN input image D6 to the DNN and executes the second DNN (Step S205). At this time, the image sensor 1 performs traffic light recognition and tracking with high accuracy. Thereafter, the image sensor 1 shifts the processing to Step S208.

In a case where the image sensor 1 has detected (recognized) the preceding vehicle C, the image sensor 1 generates image data of the third DNN input image D7 with sensor setting 3 (Step S206). Here, it is assumed that the sensor setting 3 includes low AD bit (e.g., 8 bits), binning (e.g., none), using short-exposure pixels, cutting out (e.g., the periphery of the subject), and high FPS (e.g., 60 fps).

In this case, the image sensor 1 uses the short-exposure pixels, captures the full-size image D4 at a frame rate of 60 fps, and analog-digital converts a pixel signal of the full-size image D4 with 8 bits. Thereafter, the image sensor 1 cuts out a portion in the periphery of the subject (preceding vehicle C) from the full-size image D4 without reducing the resolution of full-size image D4 to generate the image data of the third DNN input image D7.

Subsequently, the image sensor 1 inputs the image data of the third DNN input image D7 to the DNN and executes a third DNN (Step S207). At this time, the image sensor 1 performs preceding vehicle recognition and tracking with high accuracy. Thereafter, the image sensor 1 shifts the processing to Step S208.

In Step S208, the image sensor 1 determines whether or not the traffic light S or the preceding vehicle C, which is a recognition target, has been detected. Then, in a case where the image sensor 1 determines that the traffic light S or the preceding vehicle C has not been detected (Step S208, No), the processing proceeds to Step S201.

In a case where the image sensor 1 determines that the traffic light S or the preceding vehicle C has been detected (Step S208, Yes), the image sensor 1 makes an advanced driver assistance system (ADAS) notification to the AP 2 (Step S209), and ends the processing. At this time, the image sensor 1 outputs the image data and the subject detection (recognition) result to the AP 2 by, for example, a communication method conforming to the MIPI standard.

Note that the image sensor 1 does not need to output the image data and the subject detection (recognition) result to the AP 2 every time the subject is recognized. For example, the image sensor 1 can output the image data and the detection (recognition) result of the subject to the AP 2 only when requested from the AP 2.

By executing the above processing, the image sensor 1 can recognize the state of the traffic light S and the position of the preceding vehicle C with high accuracy. Specifically, the traffic light S adopting a light emitting diode (LED) flickers in a manner that the traffic light S is repeatedly turned on and off in a minute time period.

Therefore, in a case where the image sensor 1 captures an image of the traffic light S with the short-exposure pixel, the traffic light S in the captured image may be in a turned-off state. Therefore, the image sensor 1 needs to perform exposure for at least 10 ms or more in order to prevent false recognition of the subject due to flickering. On the other hand, for example, in the case of a subject that does not flicker such as a preceding vehicle, the image sensor 1 needs to shorten the exposure time in order to suppress blurring of the subject.

Figure 13:
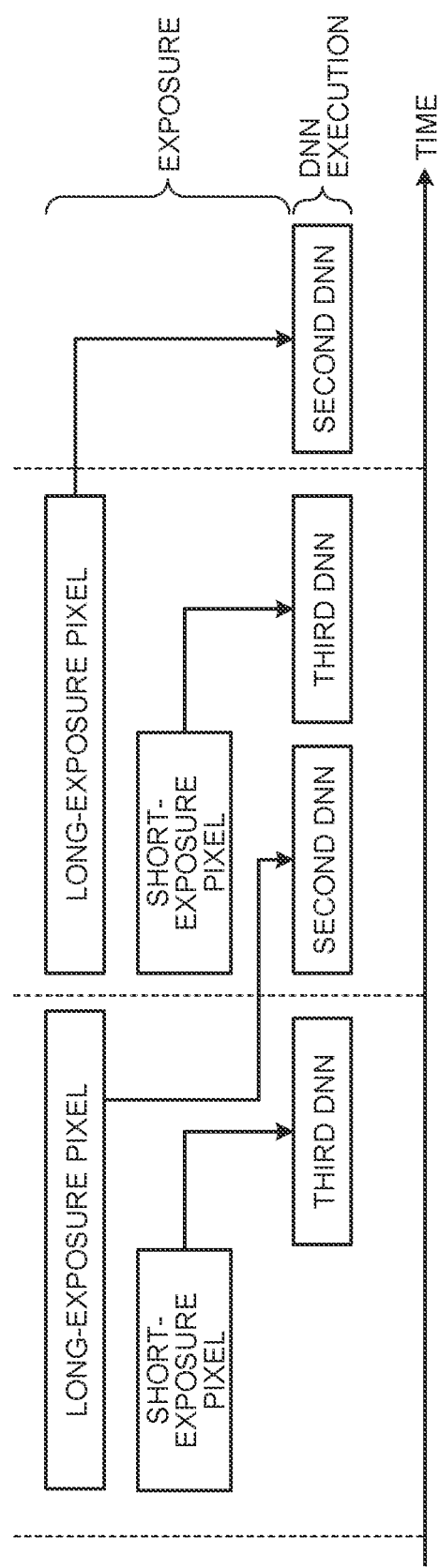
FIG. 13 is an explanatory diagram of functions and effects according to the second operation example of the image sensor according to the first embodiment of the present disclosure.

Therefore, as illustrated in FIG. 13, the image sensor 1 executes the second DNN for traffic light recognition for the image data captured by the long-exposure pixels, and executes the third DNN for preceding vehicle recognition for the image captured by the short-exposure pixels.

As a result, the image sensor 1 can recognize the state of the traffic light S with high accuracy without being affected by flickering, and can recognize the position of the preceding vehicle C with high accuracy by suppressing the blurring of the subject.

2. Second Embodiment

Next, an image recognition system according to a second embodiment will be described. In the image recognition system according to the second embodiment, a configuration of a pixel array included in an image sensor and processing executed by the image sensor are different from those in the first embodiment, and other configurations are similar to those in the first embodiment. Therefore, points different from the first embodiment will be described below.

[2-1. Pixel Array According to Second Embodiment]

Figure 14:
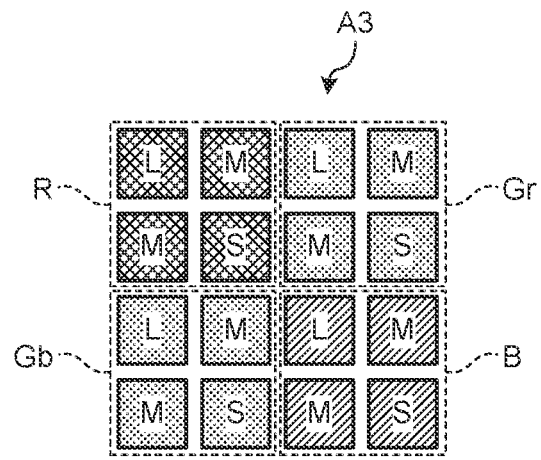
FIG. 14 is an explanatory diagram illustrating a pixel array according to a second embodiment of the present disclosure.

FIG. 14 is an explanatory diagram illustrating the pixel array according to the second embodiment of the present disclosure. In a pixel array A3 illustrated in FIG. 14, an imaging pixel R including four pixels L, M, M, and S that receive red light, imaging pixels Gr and Gb each including four pixels L, M, M, and S that receive green light, and an imaging pixel B including four pixels L, M, M, and S that receive blue light are arranged in a Bayer array.

The pixels L, M, M, and S all have the same light receiving area and different exposure times. The pixel L is a long-exposure pixel. The pixel M is a moderate-exposure pixel. The pixel S is a short-exposure pixel. The pixel array A3 normally functions as a very high-resolution pixel array by outputting a pixel signal from each pixel. Furthermore, the pixel array A3 functions as a pixel array capable of moving a subject even in a dark place by binning two pixels into one pixel in a case where the surroundings become dark.

In the image sensor according to the second embodiment, the pixel array A3 captures a long-exposure image, a moderate-exposure image, and a short-exposure image. Then, the image sensor recognizes the subject from each of the long-exposure image, the moderate-exposure image, and the short-exposure image.

Figure 15:
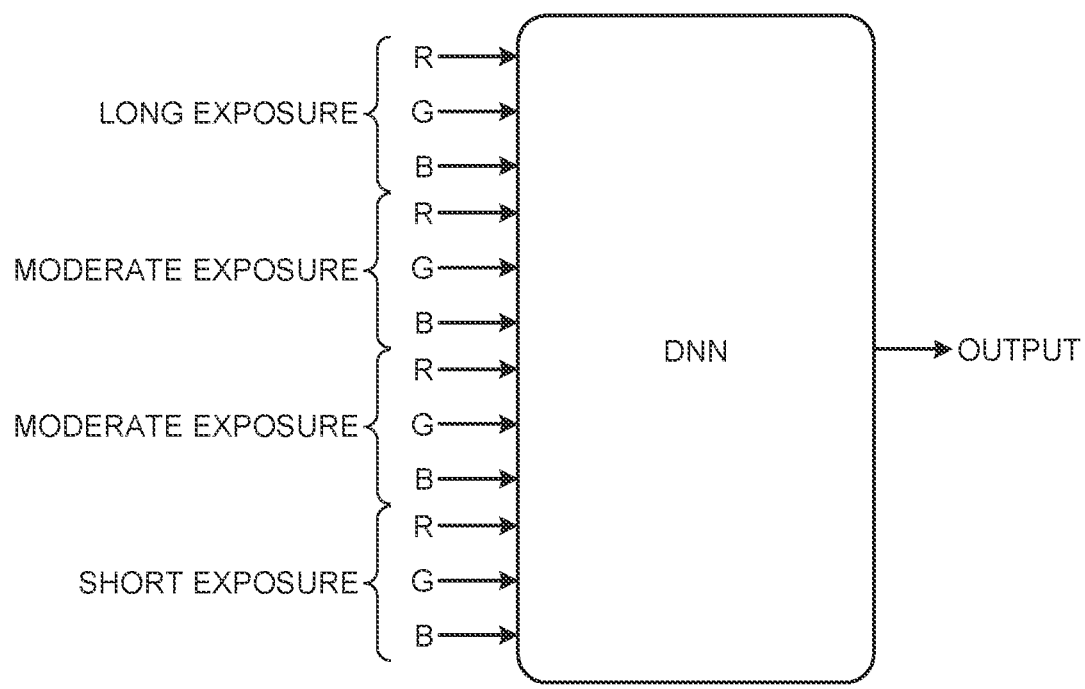
FIG. 15 is an explanatory diagram illustrating a usage example of a DNN according to the second embodiment of the present disclosure.
Figure 16:
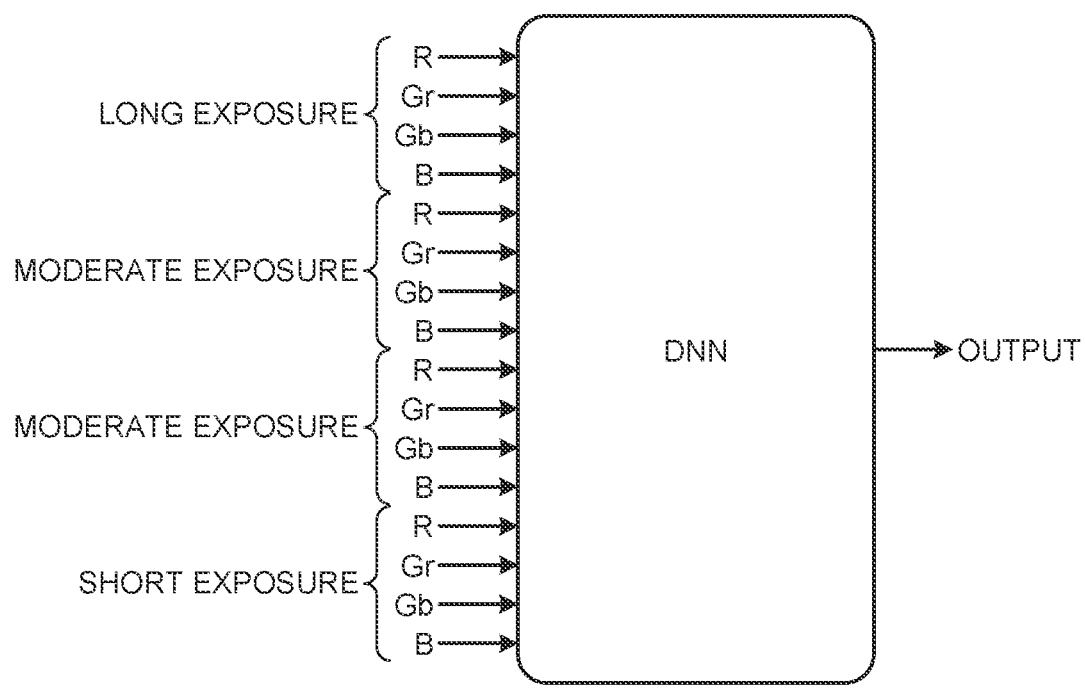
FIG. 16 is an explanatory diagram illustrating another usage example of the DNN according to the second embodiment of the present disclosure.

FIG. 15 is an explanatory diagram illustrating a usage example of a DNN according to the second embodiment of the present disclosure. FIG. 16 is an explanatory diagram illustrating another usage example of the DNN according to the second embodiment of the present disclosure. The image sensor according to the second embodiment has the same configuration as the image sensor 1 illustrated in FIG. 3.

Therefore, as illustrated in FIG. 15, the image sensor inputs long-exposure pixel signals R, G, and B after demosaicing, moderate-exposure pixel signals R, G, and B, and short-exposure pixel signals R, G, and B to the DNN.

A result of recognizing the subject from each of the long-exposure image, the moderate-exposure image, and the short-exposure image is output from the DNN. As a result, the image sensor can recognize a high-luminance subject, a moderate-luminance subject, and a low-luminance subject with high accuracy from the long-exposure image, the moderate-exposure image, and the short-exposure image that do not include the artifact, respectively.

Furthermore, in the image sensor according to the second embodiment, demosaicing can be omitted similarly to the first embodiment, and signal processing performed by the signal processing unit 13 can be omitted. In such a case, as illustrated in FIG. 16, the image sensor inputs the long-exposure pixel signals R, Gr, Gb, and B, the moderate-exposure pixel signals R, Gr, Gb, and B, and the short-exposure pixel signals R, Gr, Bb, and B, which are not demosaiced, to the DNN.

As a result, the throughput increases since the number of input channels of the DNN increases, but since image data of the long-exposure image, the moderate-exposure image, and the short-exposure image are individually input to the DNN, the subject can be recognized with high accuracy without being affected by the artifact.

[2-2. Specific Example of Processing Executed by Image Sensor According to Second Embodiment]

Next, a specific example of processing executed by the image sensor according to the first embodiment will be described with reference to FIG. 17. Here, processing executed in a case where the image sensor recognizes a preceding vehicle and a traffic light from an image will be described.

Figure 17:
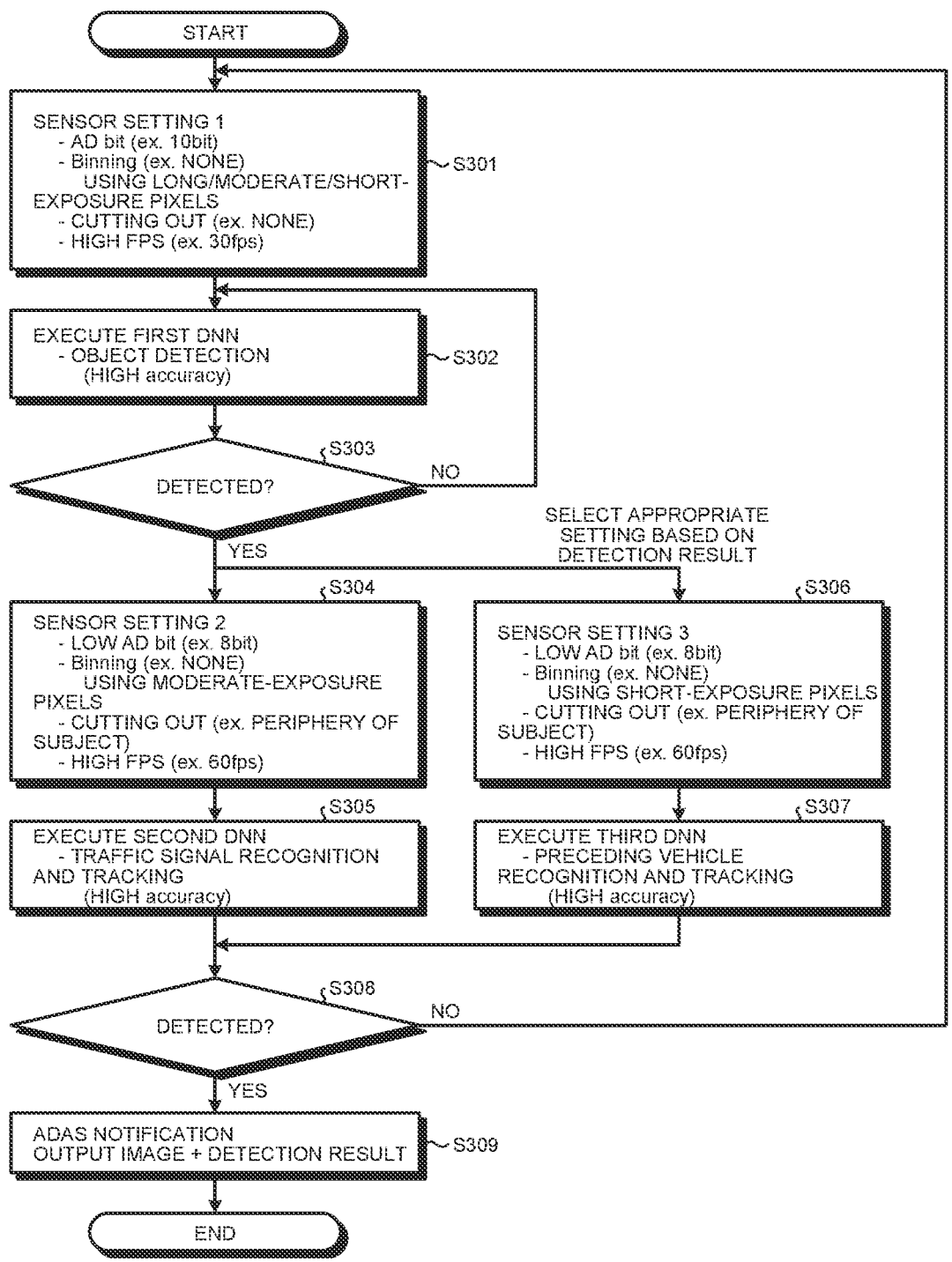
FIG. 17 is a flowchart illustrating a specific example of processing executed by an image sensor according to the second embodiment of the present disclosure.

FIG. 17 is a flowchart illustrating the specific example of the processing executed by the image sensor according to the second embodiment of the present disclosure. The image sensor according to the second embodiment generates image data of a full-size image D4, a first DNN input image D5, a second DNN input image D6, and a third DNN input image D7 similar to the respective images illustrated in FIG. 11, but the contents of sensor settings 1, 2, and 3 are different from those of the first embodiment.

Specifically, as illustrated in FIG. 17, the image sensor first generates image data of the first DNN input image D5 with the sensor setting 1 (Step S301). Here, it is assumed that the sensor setting 1 includes AD bit (e.g., 10 bits), binning (e.g., none), using long/moderate/short-exposure pixels, cutting out (e.g., none), and high FPS (e.g., 30 fps).

In this case, the image sensor uses the long-exposure pixels, the moderate-exposure pixels, and the short-exposure pixels, captures the full-size image D4 at a frame rate of 30 fps, and analog-digital converts the pixel signal of the full-size image D4 with 10 bits. Then, the image sensor generates the first DNN input image D5 without reducing the resolution of the full-size image D4 and without cutting out the image.

Subsequently, the image sensor inputs the image data of the first DNN input image D5 to the DNN and executes a first DNN (Step S302). At this time, the image sensor detects an object with high accuracy. Thereafter, the image sensor determines whether or not an object has been detected (Step S303).

Then, in a case where the image sensor determines that an object has not been detected (Step S303, No), the processing proceeds to Step S302. Furthermore, in a case where the image sensor determines that an object has been detected (Step S303, Yes), the image sensor selects an appropriate setting from the detection result.

For example, in a case where the image sensor has detected (recognized) the traffic light S, the image sensor generates image data of the second DNN input image D6 with the sensor setting 2 (Step S304). Here, it is assumed that the sensor setting 2 includes low AD bit (e.g., 8 bits), binning (e.g., none), using moderate-exposure pixels, cutting out (e.g., the periphery of the subject), and high FPS (e.g., 60 fps).

In this case, the image sensor uses the moderate-exposure pixels, captures the full-size image D4 at a frame rate of 60 fps, and analog-digital converts a pixel signal of the full-size image D4 with 8 bits. Thereafter, the image sensor cuts out a portion in the periphery of the subject (traffic light S) from the full-size image D4 without reducing the resolution of full-size image D4 to generate the image data of the second DNN input image D6.

Subsequently, the image sensor inputs the image data of the second DNN input image D6 to the DNN and executes a second DNN (Step S305). At this time, the image sensor performs traffic light recognition and tracking with high accuracy. Thereafter, the image sensor shifts the processing to Step S308.

In a case where the image sensor has detected (recognized) the preceding vehicle C, the image sensor generates image data of the third DNN input image D7 with sensor setting 3 (Step S306). Here, it is assumed that the sensor setting 3 includes low AD bit (e.g., 8 bits), binning (e.g., none), using short-exposure pixels, cutting out (e.g., the periphery of the subject), and high FPS (e.g., 60 fps).

In this case, the image sensor uses the short-exposure pixels, captures the full-size image D4 at a frame rate of 60 fps, and analog-digital converts a pixel signal of the full-size image D4 with 8 bits. Thereafter, the image sensor cuts out a portion in the periphery of the subject (preceding vehicle C) from the full-size image D4 without reducing the resolution of full-size image D4 to generate the image data of the third DNN input image D7.

Subsequently, the image sensor inputs the image data of the third DNN input image D7 to the DNN and executes a third DNN (Step S307). At this time, the image sensor performs preceding vehicle recognition and tracking with high accuracy. Thereafter, the image sensor shifts the processing to Step S308.

In Step S308, the image sensor determines whether or not the traffic light S or the preceding vehicle C, which is a recognition target, has been detected. Then, in a case where the image sensor determines that the traffic light S or the preceding vehicle C has not been detected (Step S308, No), the processing proceeds to Step S301.

In a case where the image sensor determines that the traffic light S or the preceding vehicle C has been detected (Step S308, Yes), the image sensor makes an ADAS notification to the AP 2 (Step S309), and ends the processing.

Note that the image sensor 1 does not need to output the image data and the subject detection (recognition) result to the AP 2 every time the subject is recognized. For example, the image sensor 1 can output the image data and the detection (recognition) result of the subject to the AP 2 only when requested from the AP 2.

As described above, the image sensor according to the second embodiment executes the second DNN for traffic light recognition for the image data captured by the moderate-exposure pixels, and executes the third DNN for preceding vehicle recognition for the image captured by the short-exposure pixels.

As a result, the image sensor can recognize the state of the traffic light S with high accuracy without being affected by flickering, and can recognize the position of the preceding vehicle C with high accuracy by suppressing the blurring of the subject.

[2-3. Another Pixel Array According to Second Embodiment]

Figure 18:
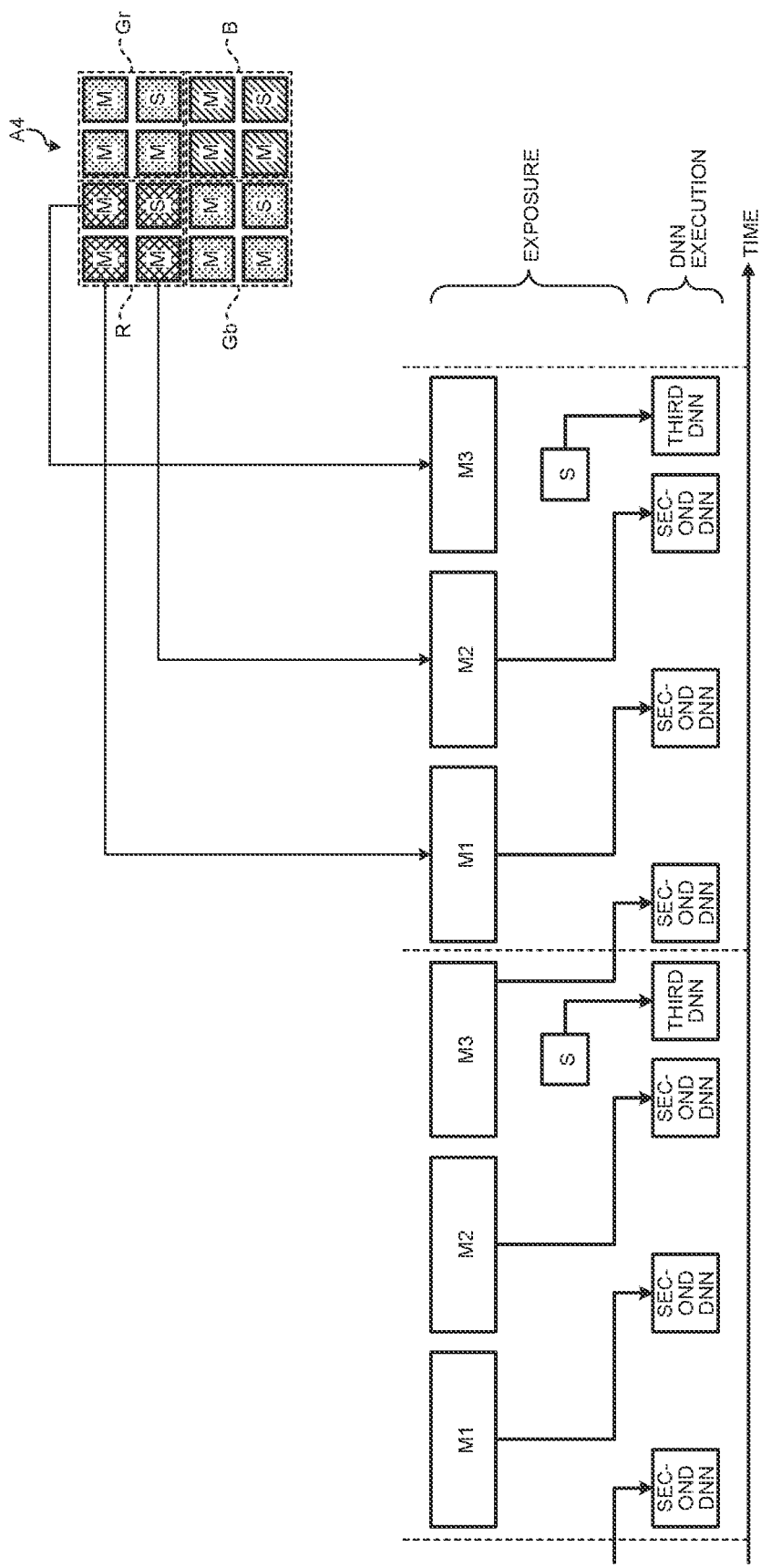
FIG. 18 is an explanatory diagram illustrating an operation example of an image sensor adopting another pixel array according to the second embodiment of the present disclosure.

The pixel array according to the second embodiment is not limited to the pixel array A3 illustrated in FIG. 14. Next, an operation example of the image sensor in a case where another pixel array is adopted will be described with reference to FIG. 18. FIG. 18 is an explanatory diagram illustrating an operation example of an image sensor adopting another pixel array according to the second embodiment of the present disclosure.

The image sensor may adopt a pixel array A4 illustrated on the upper right side of FIG. 18. In the pixel array A4, an imaging pixel R including four pixels M, M, M, and S that receive red light, imaging pixels Gr and Gb each including four pixels M, M, M, and S that receive green light, and an imaging pixel B including four pixels M, M, M, and S that receive blue light are arranged in a Bayer array. The pixels M, M, M, and S all have the same light receiving area and different exposure times. The pixel M is a moderate-exposure pixel. The pixel S is a short-exposure pixel.

In a case where the pixel array A3 is adopted, the image sensor independently performs a shutter control and a pixel signal reading control for each of the pixels M, M, M, and S of the pixel array A3. Here, as described above, the image sensor needs to perform long-exposure for 10 ms or more in order to accurately recognize the state of the traffic signal that flickers. However, when the image sensor performs long-exposure of a normal pixel for 10 ms or more in the daytime, the pixel may be saturated.

Therefore, in a case where the pixel array A3 is adopted, as illustrated in FIG. 18, for example, the image sensor sequentially exposes three moderate-exposure pixels M, M, and M in time series for 3.3 ms each. As a result, each of the three moderate-exposure pixels M, M, and M is not saturated. Furthermore, at this time, the image sensor simultaneously exposes the short-exposure pixel S for a short time.

Then, the image sensor executes the second DNN for traffic light recognition for each image data of the moderate-exposure image, and executes the third DNN for preceding vehicle recognition for the image data of the short-exposure image. As a result, the image sensor can recognize the state of the traffic light with high accuracy without being affected by flickering, and can recognize the position of the preceding vehicle with high accuracy by suppressing the blurring of the subject.

[2-4. Another Operation Example of Image Sensor According to Second Embodiment]

Figure 19:
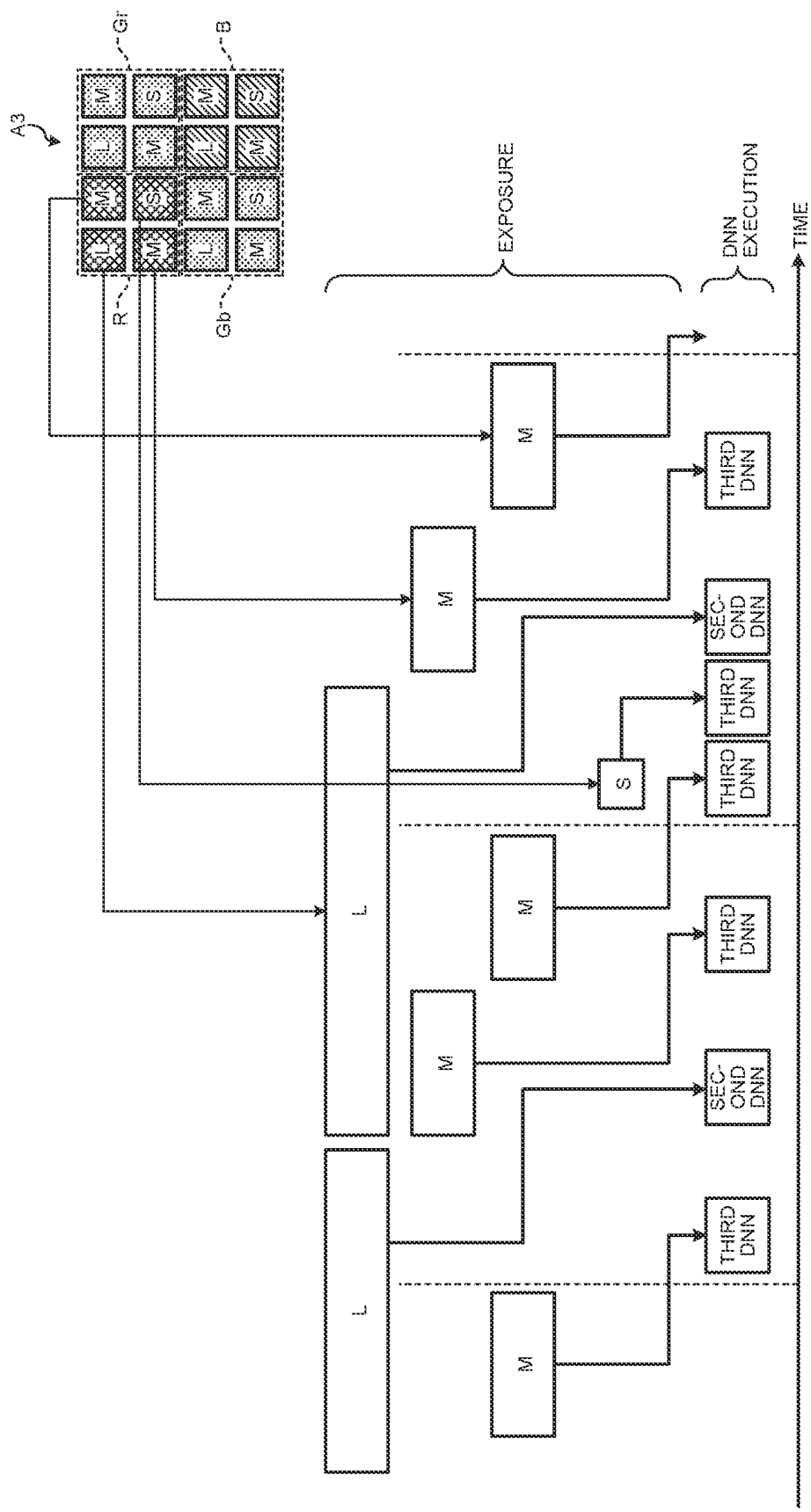
FIG. 19 is an explanatory diagram of another operation example of the image sensor according to the second embodiment.

Next, another operation example of the image sensor according to the second embodiment will be described with reference to FIG. 19. FIG. 19 is an explanatory diagram of another operation example of the image sensor according to the second embodiment. Note that, here, it is assumed that the image sensor includes the pixel array A3 illustrated in FIG. 14.

However, a color filter having a low light transmittance is provided on the long-exposure pixel L of the pixel array A3 illustrated in FIG. 19, a color filter having a moderate light transmittance is provided on the moderate-exposure pixel M, and a color filter having a high light transmittance is provided on the short-exposure pixel S.

In such a configuration, as illustrated in FIG. 19, the image sensor generates image data of a low-sensitivity image by exposing the long-exposure pixel L for a long time, and executes the second DNN for traffic signal recognition for the image data of the low-sensitivity image. At this time, since the color filter having a low light transmittance is stacked on the long-exposure pixel L, saturation does not occur even when the exposure is performed for a long time. As a result, the image sensor can recognize the state of the traffic light with high accuracy without being affected by flickering.

In addition, the image sensor exposes the moderate-exposure image M for a moderate length of time to generate a moderate-sensitivity image, exposes the short-exposure pixel S for a short time to generate a high-sensitivity image, and executes the third DNN for preceding vehicle recognition for each of image data of the moderate-sensitivity image and the high-sensitivity image. As a result, the image sensor can recognize the position of the preceding vehicle with high accuracy by suppressing the blurring of the subject.

3. Example of Application to Moving Body

The technology (present technology) according to the present disclosure can be applied to various products. For example, the technology according to the present disclosure may be implemented as a device mounted in any one of moving bodies such as a vehicle, an electric vehicle, a hybrid electric vehicle, a motorcycle, a bicycle, a personal mobility device, a plane, a drone, a ship, and a robot.

Figure 20:
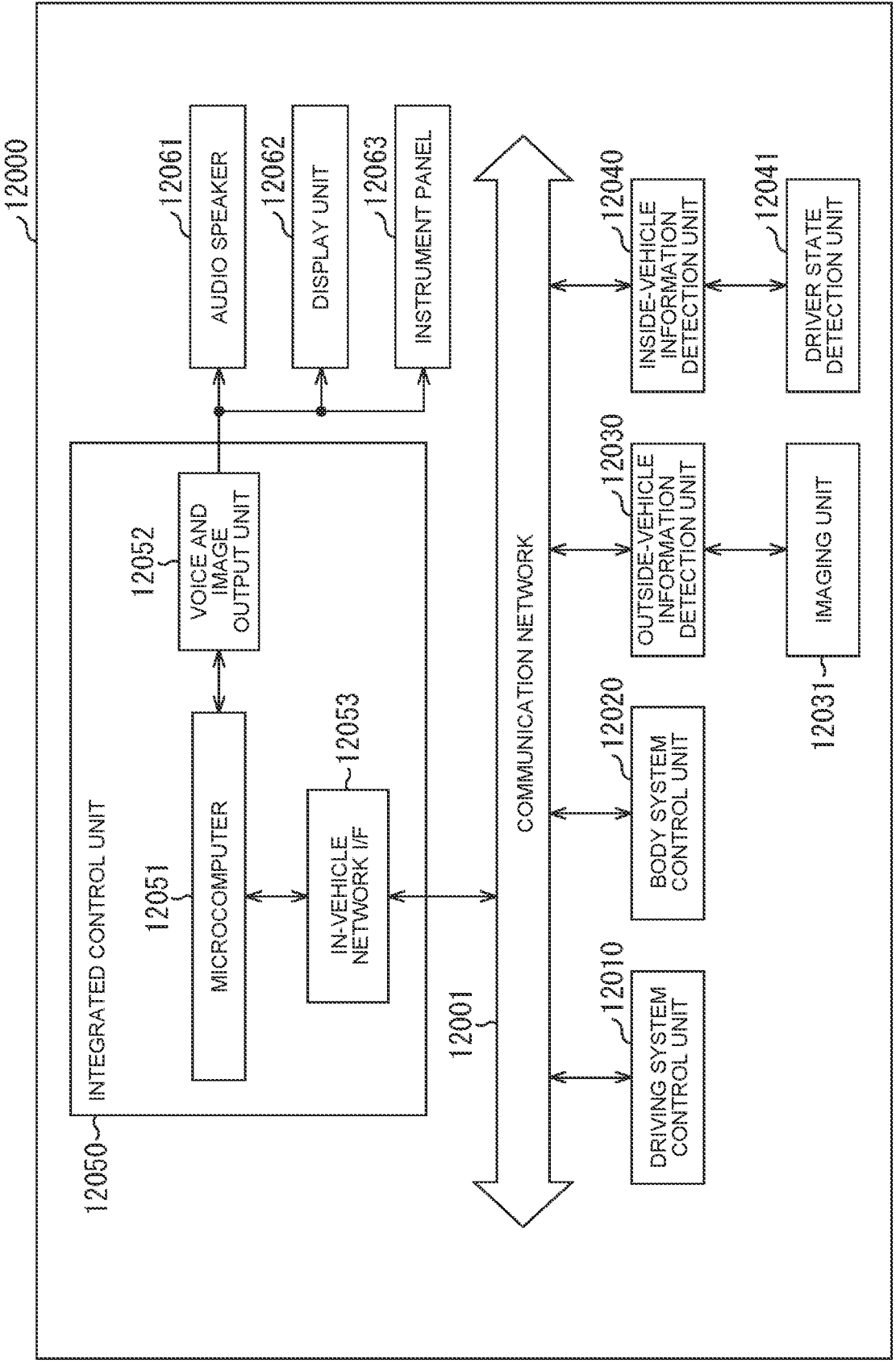
FIG. 20 is a block diagram illustrating an example of a schematic configuration of a vehicle control system.

FIG. 20 is a block diagram illustrating an example of a schematic configuration of a vehicle control system which is an example of a moving body control system to which the technology according to the present disclosure can be applied.

A vehicle control system 12000 includes a plurality of electronic control units connected through a communication network 12001. In the example illustrated in FIG. 20, the vehicle control system 12000 includes a driving system control unit 12010, a body system control unit 12020, an outside-vehicle information detection unit 12030, an inside-vehicle information detection unit 12040, and an integrated control unit 12050. Furthermore, as a functional configuration of the integrated control unit 12050, a microcomputer 12051, a voice and image output unit 12052, and an in-vehicle network interface (I/F) 12053 are illustrated.

The driving system control unit 12010 controls an operation of a device related to a driving system of a vehicle according to various programs. For example, the driving system control unit 12010 functions as a control device such as a driving force generation device for generating a driving force of a vehicle such as an internal combustion engine, a driving motor, or the like, a driving force transmission mechanism for transmitting a driving force to vehicle wheels, a steering mechanism for adjusting a steering angle of the vehicle, a brake device for generating a braking force of the vehicle, or the like.

The body system control unit 12020 controls an operation of various devices mounted in a vehicle body according to various programs. For example, the body system control unit 12020 functions as a keyless entry system, a smart key system, a power window device, or a control device for various lamps such as a head lamp, a back lamp, a brake lamp, a blinker, a fog lamp, and the like. In this case, electric waves sent from a portable machine substituting for a key and a signal of various switches can be input to the body system control unit 12020. The body system control unit 12020 receives the electric waves or the signal to control a door-lock device of a vehicle, a power window device, a lamp, or the like.

The outside-vehicle information detection unit 12030 detects information regarding an outside area of a vehicle in which the vehicle control system 12000 is mounted. For example, an imaging unit 12031 is connected to the outside-vehicle information detection unit 12030. The outside-vehicle information detection unit 12030 causes the imaging unit 12031 to capture an image of an area outside the vehicle, and receives the captured image. The outside-vehicle information detection unit 12030 may perform processing of detecting an object such as a person, a car, an obstacle, a sign, a letter on a road surface, or the like, or perform distance detection processing on the basis of the received image.

The imaging unit 12031 is an optical sensor that receives light and outputs an electric signal corresponding to the amount of received light. The imaging unit 12031 can output the electric signal as an image, or can output the electric signal as distance measurement information. Furthermore, the light received by the imaging unit 12031 may be visible light or invisible light such as infrared rays or the like.

The inside-vehicle information detection unit 12040 detects information regarding an inside area of the vehicle. For example, a driver state detection unit 12041 detecting a state of a driver is connected to the inside-vehicle information detection unit 12040. The driver state detection unit 12041 includes, for example, a camera capturing an image of the driver, and the inside-vehicle information detection unit 12040 may calculate a degree of fatigue or a degree of concentration of the driver, or discriminate whether or not the driver dozes off on the basis of detection information input from the driver state detection unit 12041.

The microcomputer 12051 can calculate a target control value of a driving force generation device, a steering mechanism, or a brake device on the basis of information regarding the inside area and the outside area of the vehicle, the information being acquired by the outside-vehicle information detection unit 12030 or the inside-vehicle information detection unit 12040, and output a control instruction to the driving system control unit 12010. For example, the microcomputer 12051 can perform a cooperative control for the purpose of implementing functions of an advanced driver assistance system (ADAS) including vehicle collision avoidance, impact alleviation, following traveling based on an inter-vehicle distance, traveling while maintaining a vehicle speed, a vehicle collision warning, a vehicle lane departure warning, or the like.

Furthermore, the microcomputer 12051 can perform a cooperative control for the purpose of an automatic driving in which a vehicle autonomously travels without an operation by a driver by controlling a driving force generation device, a steering mechanism, a brake device, or the like on the basis of information regarding a surrounding area of the vehicle acquired by the outside-vehicle information detection unit 12030 or the inside-vehicle information detection unit 12040, or the like.

Furthermore, the microcomputer 12051 can output a control instruction to the body system control unit 12020 on the basis of outside-vehicle information acquired by the outside-vehicle information detection unit 12030. For example, the microcomputer 12051 can perform a cooperative control for the purpose of preventing glare by controlling a headlamp according to a position of a preceding vehicle or an oncoming vehicle detected by the outside-vehicle information detection unit 12030 to switch a high beam to a low beam, or the like.

The voice and image output unit 12052 sends an output signal of at least one of voice or an image to an output device which is capable of visually or acoustically notifying a passenger of a vehicle or an outside area of the vehicle of information. In the example in FIG. 20, an audio speaker 12061, a display unit 12062, and an instrument panel 12063 are illustrated as the output devices. The display unit 12062 may include at least one of, for example, an on-board display or a head-up display.

Figure 21:
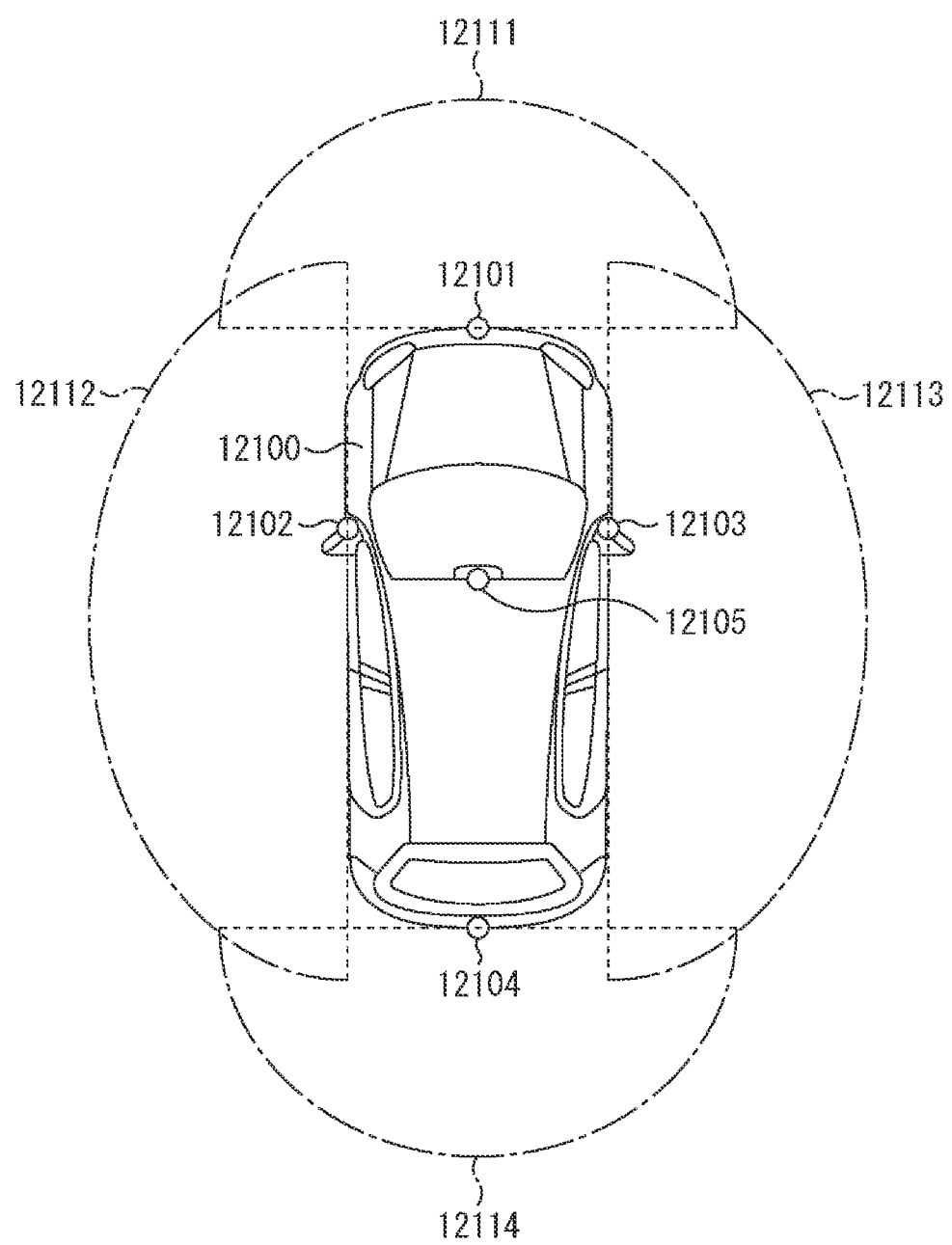
FIG. 21 is an explanatory diagram illustrating an example of installation positions of an outside-vehicle information detection unit and an imaging unit.

FIG. 21 is a diagram illustrating an example of an installation position of the imaging unit 12031.

In FIG. 21, a vehicle 12100 includes imaging units 12101, 12102, 12103, 12104, and 12105 as the imaging unit 12031.

The imaging units 12101, 12102, 12103, 12104, and 12105 are provided at, for example, a front nose, side mirrors, a rear bumper, a back door, an upper portion of a windshield in a compartment, and the like of the vehicle 12100. The imaging unit 12101 provided at the front nose and the imaging unit 12105 provided at the upper portion of the windshield in the compartment mainly acquire an image of an area in front of the vehicle 12100. The imaging units 12102 and 12103 provided at side mirrors mainly acquire images of areas on sides of the vehicle 12100. The imaging unit 12104 provided at the rear bumper or the back door mainly acquires an image of an area behind the vehicle 12100. The image of the area in front of the vehicle 12100 acquired by the imaging units 12101 and 12105 is mainly used to detect a preceding vehicle, a pedestrian, an obstacle, a traffic light, a traffic sign, a lane, or the like.

Note that FIG. 21 illustrates an example of imaging ranges of the imaging units 12101 to 12104. An image capturing range 12111 indicates an image capturing range of the imaging unit 12101 provided at the front nose, image capturing ranges 12112 and 12113 indicate image capturing ranges of the imaging units 12102 and 12103 provided at the side mirrors, respectively, and an image capturing range 12114 indicates an image capturing range of the imaging unit 12104 provided at the rear bumper or the back door. For example, image data captured by the imaging units 12101 to 12104 are superimposed, thereby obtaining a bird's eye view image from above the vehicle 12100.

At least one of the imaging units 12101 to 12104 may have a function of acquiring distance information. For example, at least one of the imaging units 12101 to 12104 may be a stereo camera including a plurality of image capturing elements, or may be an image capturing element with pixels for phase difference detection.

For example, the microcomputer 12051 can extract a three-dimensional object traveling at a predetermined speed (for example, 0 km/h or higher) in substantially the same direction as that of the vehicle 12100, particularly, the closest three-dimensional object on a traveling path of the vehicle 12100, as a preceding vehicle, by calculating a distance to each three-dimensional object in the image capturing ranges 12111 to 12114, and a temporal change (relative speed with respect to the vehicle 12100) in the distance on the basis of the distance information acquired from the imaging units 12101 to 12104. Moreover, the microcomputer 12051 can set an inter-vehicle distance to be secured in advance for a preceding vehicle, and can perform an automatic brake control (including a following stop control), an automatic acceleration control (including a following start control), and the like. As described above, a cooperative control for the purpose of an automatic driving in which a vehicle autonomously travels without an operation by a driver, or the like, can be performed.

For example, the microcomputer 12051 can classify and extract three-dimensional object data related to a three-dimensional object as a two-wheeled vehicle, an ordinary vehicle, a large vehicle, a pedestrian, and another three-dimensional object such as a power pole, on the basis of the distance information obtained from the imaging units 12101 to 12104, and use a result of the classification and extraction for automatic avoidance of obstacles. For example, the microcomputer 12051 identifies an obstacle around the vehicle 12100 as an obstacle that is visible to the driver of the vehicle 12100 or an obstacle that is hardly visible. Then, the microcomputer 12051 determines a collision risk indicating a risk of collision with each obstacle, and in a case where the collision risk is equal to or higher than a set value and there is a possibility of collision, the microcomputer 12051 can output an alarm to the driver through the audio speaker 12061 or the display unit 12062 or perform forced deceleration or avoidance steering through the driving system control unit 12010 to perform driving assistance for collision avoidance.

At least one of the imaging units 12101 to 12104 may be an infrared camera that detects infrared rays. For example, the microcomputer 12051 can recognize a pedestrian by determining whether or not a pedestrian is present in captured images of the imaging units 12101 to 12104. Such a recognition of a pedestrian is performed through a procedure for extracting feature points in the captured images of the imaging units 12101 to 12104 that are, for example, infrared cameras, and a procedure for discriminating whether or not an object is a pedestrian by performing pattern matching processing on a series of feature points indicating an outline of the object. In a case where the microcomputer 12051 determines that a pedestrian is present in the captured images of the imaging units 12101 to 12104 and recognizes the pedestrian, the voice and image output unit 12052 controls the display unit 12062 to superimpose a rectangular contour line for emphasis on the recognized pedestrian. Furthermore, the voice and image output unit 12052 may control the display unit 12062 to display an icon or the like indicating a pedestrian at a desired position.

Hereinabove, an example of the vehicle control system to which the technology according to the present disclosure can be applied has been described. The technology according to the present disclosure can be applied to, for example, the outside-vehicle information detection unit 12030, the imaging unit 12031, the inside-vehicle information detection unit 12040, the driver state detection unit 12041, and the like in the configuration described above. For example, the image sensor 1 in FIG. 3 can be applied to the imaging unit 12031. By applying the technology according to the present disclosure to the imaging unit 12031, for example, a more easily viewable captured image can be obtained, such that driver's fatigue can be reduced.

4. Effects

The image sensor 1, which is an example of the image recognition device, includes the imaging unit 10 and the recognition unit 14. The imaging unit 10 captures a plurality of images at the same exposure start timing in one frame period by using the imaging pixels having different sensitivities to generate the image data. The recognition unit 14 recognizes a subject from each of the image data. As a result, the image sensor 1 can eliminate the influence of the artifact, thereby improving the accuracy in recognizing the subject.

Furthermore, the imaging unit 10 includes the pixel array in which a plurality of imaging pixels having the same light receiving area and different exposure times are two-dimensionally arranged. Thus, the image sensor 1 can recognize the subject with high accuracy from each of the long-exposure image and the short-exposure image.

Furthermore, the imaging unit 10 includes the pixel array in which a plurality of imaging pixels having the same light receiving area and having different light transmittances of the color filters stacked thereon are two-dimensionally arranged. As a result, the image sensor 1 can recognize the subject with high accuracy from each of the high-sensitivity image and the low-sensitivity image.

Furthermore, the imaging unit 10 includes the pixel array in which a plurality of imaging pixels having different light receiving areas are two-dimensionally arranged. As a result, as a result, the image sensor 1 can recognize the subject with high accuracy based on the pixel signal of the large pixel and the pixel signal of the small pixel.

Furthermore, the imaging unit 10 includes the pixel array in which the long-exposure imaging pixel, the moderate-exposure imaging pixel, and the short-exposure imaging pixel are two-dimensionally arranged. Thus, the image sensor 1 can recognize the subject with high accuracy from each of the long-exposure image, the moderate-exposure image, and the short-exposure image.

Furthermore, the imaging unit 10 includes the pixel array in which the low-sensitivity imaging pixel, the moderate-sensitivity imaging pixel, and the high-sensitivity imaging pixel are two-dimensionally arranged. Thus, the image sensor 1 can recognize the subject with high accuracy from each of the high-sensitivity image, the moderate-sensitivity image, and the low-sensitivity image.

Furthermore, in a case where the subject is recognized, the recognition unit 14 outputs the subject recognition result and the image data to a device in the subsequent stage, and in a case where the subject is not recognized, the recognition unit 14 outputs information indicating that the subject is not recognized to the device in the subsequent stage. As a result, the image sensor 1 can reduce power consumption in a case where the subject is not recognized.

Furthermore, the recognition unit 14 recognizes the subject from the image data that are subjected to the demosaicing processing. Thus, for example, the image sensor 1 can recognize the subject with high accuracy while reducing the processing load by reducing the number of input channels of the DNN.

Furthermore, the recognition unit 14 recognizes the subject from the image data that are not subjected to the demosaicing processing. As a result, for example, although the number of input channels of the DNN increases, the image sensor 1 can recognize the subject with high accuracy.

The recognition unit recognizes the subject from the image data input from the imaging unit. As a result, since the signal processing can be omitted, the image sensor 1 can recognize the subject with high accuracy while significantly reducing the processing load.

Furthermore, before the subject is detected by the recognition unit 14, the imaging unit 10 uses the imaging pixel having a low sensitivity to generate image data of an entire image captured at a low resolution and a low frame rate. After the subject is detected by the recognition unit, the imaging unit 10 uses the imaging pixel having a high sensitivity to generate image data obtained by cutting out the subject from an image captured at a high resolution and a high frame rate. The recognition unit 14 recognizes whether or not a subject is present in the image data before detecting the subject, and identifies the subject after detecting the subject. As a result, the image sensor can reduce the processing load and power consumption required to detect the subject.

Furthermore, before the subject is detected by the recognition unit 14, the imaging unit 10 uses the imaging pixel having a low sensitivity and the imaging pixel having a high sensitivity to generate image data of an entire image captured at a high resolution and a high frame rate. In a case where the subject detected by the recognition unit 14 is a traffic light, the imaging unit 10 uses the imaging pixel having a low sensitivity, and in a case where the subject is a vehicle, the imaging unit 10 uses the imaging pixel having a high sensitivity to generate image data obtained by cutting out the subject from an image captured at a high resolution and a high frame rate. The recognition unit 14 executes processing of recognizing the subject from the image data before detecting the subject, and executes recognition processing according to the subject based on the image data after recognizing the subject. As a result, the image sensor can accurately recognize the state of the traffic light that flickers, and can recognize the position of the preceding vehicle with high accuracy.

Furthermore, before the subject is detected by the recognition unit 14, the imaging unit 10 uses the long-exposure imaging pixel, the moderate-exposure imaging pixel, and the short-exposure imaging pixel to generate image data of an entire image captured at a high resolution and a high frame rate. In a case where the subject detected by the recognition unit 14 is a traffic light, the imaging unit 10 uses the moderate-exposure imaging pixel, and in a case where the subject is a vehicle, the imaging unit 10 uses the short-exposure imaging pixel to generate image data obtained by cutting out the subject from an image captured at a high resolution and a high frame rate. The recognition unit 14 executes processing of recognizing the subject from the image data before detecting the subject, and executes recognition processing according to the subject based on the image data after recognizing the subject. As a result, the image sensor can accurately recognize the state of the traffic light that flickers, and can recognize the position of the preceding vehicle with high accuracy.

In addition, in the image recognition method, a plurality of images are captured at the same exposure start timing in one frame period by using imaging pixels having different sensitivities to generate image data, and a subject is recognized from each of the image data. As a result, it is possible to eliminate the influence of the artifact, thereby improving the accuracy in recognizing the subject.

Note that the effects in each embodiment described in the present specification are merely examples. The effects of the present disclosure are not limited thereto, and other effects may be obtained.

Note that the present technology can also have the following configurations.

(1)

An image recognition device including:

an imaging unit that captures a plurality of images at the same exposure start timing in one frame period by using imaging pixels having different sensitivities to generate image data; and a recognition unit that recognizes a subject from each of the image data.

(2)

The image recognition device according to (1), wherein the imaging unit includes a pixel array in which a plurality of the imaging pixels having the same light receiving area and different exposure times are two-dimensionally arranged.

(3)

The image recognition device according to (1), wherein the imaging unit includes a pixel array in which a plurality of the imaging pixels having the same light receiving area and having different light transmittances of color filters stacked thereon are two-dimensionally arranged.

(4)

The image recognition device according to (1), wherein the imaging unit includes a pixel array in which a plurality of the imaging pixels having different light receiving areas are two-dimensionally arranged.

(5)

The image recognition device according to (1), wherein the imaging unit includes a pixel array in which a long-exposure imaging pixel, a moderate-exposure imaging pixel, and a short-exposure imaging pixel are two-dimensionally arranged.

(6)

The image recognition device according to (1), wherein the imaging unit includes a pixel array in which a low-sensitivity imaging pixel, a moderate-sensitivity imaging pixel, and a high-sensitivity imaging pixel are two-dimensionally arranged.

(7)

7. The image recognition device according to any one of (1) to (6), wherein in a case where the subject is recognized, the recognition unit outputs a result of recognizing the subject and the image data to a device in a subsequent stage, and in a case where the subject is not recognized, the recognition unit outputs information indicating that the subject is not recognized to the device in the subsequent stage.

(8)

The image recognition device according to any one of (1) to (6), wherein the recognition unit recognizes the subject from the image data that are subjected to demosaicing processing.

(9)

The image recognition device according to any one of (1) to (6), wherein the recognition unit recognizes the subject from the image data that are not subjected to demosaicing processing.

(10)

10. The image recognition device according to any one of (1) to (6), wherein the recognition unit recognizes the subject from the image data input from the imaging unit.

(11)

The image recognition device according to any one of (1) to (10), wherein before the subject is detected by the recognition unit, the imaging unit uses the imaging pixel having a low sensitivity to generate image data of an entire image captured at a low resolution and a low frame rate, after the subject is detected by the recognition unit, the imaging unit uses the imaging pixel having a high sensitivity to generate image data obtained by cutting out the subject from an image captured at a high resolution and a high frame rate, and the recognition unit recognizes whether or not the subject is present in the image data before detecting the subject, and identifies the subject after detecting the subject.

(12)

The image recognition device according to any one of (1) to (10), wherein before the subject is detected by the recognition unit, the imaging unit uses the imaging pixel having a low sensitivity and the imaging pixel having a high sensitivity to generate image data of an entire image captured at a high resolution and a high frame rate, in a case where the subject detected by the recognition unit is a traffic light, the imaging unit uses the imaging pixel having a low sensitivity, and in a case where the subject is a vehicle, the imaging unit uses the imaging pixel having a high sensitivity to generate image data obtained by cutting out the subject from an image captured at a high resolution and a high frame rate, and the recognition unit executes processing of recognizing the subject from the image data before detecting the subject, and executes recognition processing according to the subject based on the image data after recognizing the subject.

(13)

The image recognition device according to (5), wherein before the subject is detected by the recognition unit, the imaging unit uses the long-exposure imaging pixel, the moderate-exposure imaging pixel, and the short-exposure imaging pixel to generate image data of an entire image captured at a high resolution and a high frame rate, in a case where the subject detected by the recognition unit is a traffic light, the imaging unit uses the moderate-exposure imaging pixel, and in a case where the subject is a vehicle, the imaging unit uses the short-exposure imaging pixel to generate image data obtained by cutting out the subject from an image captured at a high resolution and a high frame rate, and the recognition unit executes processing of recognizing the subject from the image data before detecting the subject, and executes recognition processing according to the subject based on the image data after recognizing the subject.

(14)

An image recognition method including:

capturing a plurality of images at the same exposure start timing in one frame period by using imaging pixels having different sensitivities to generate image data; and recognizing a subject from each of the image data.

REFERENCE SIGNS LIST

100 IMAGE RECOGNITION SYSTEM
1 IMAGE SENSOR
10 IMAGING UNIT
11 IMAGING ELEMENT
12 A/D CONVERSION UNIT
13 SIGNAL PROCESSING UNIT
14 RECOGNITION UNIT
15 DATA TRANSMISSION DETERMINATION UNIT
16 SEL
17 TRANSMISSION UNIT
2 AP
21 RECEPTION UNIT
22 AUTHENTICATION UNIT
23 AUTHENTICATION DATA STORAGE UNIT
31 OBJECT RECOGNITION UNIT
32 OBJECT RECOGNITION DATA STORAGE UNIT

The invention claimed is:

1. An image recognition device comprising:

an imager configured to capture a plurality of images at a same exposure start timing in one frame period by using imaging pixels having different sensitivities to generate image data; and a processor configured to recognize a subject from the image data, wherein before the subject is detected by the processor, the imager uses at least one of the imaging pixels that has a first sensitivity to generate image data of an entire image captured at a first resolution, after the subject is detected by the processor, the imager uses at least one of the imaging pixels that has a second sensitivity to generate image data obtained by cutting out the subject from an image captured at a second resolution, and the first sensitivity is lower than the second sensitivity and the first resolution is lower than the second resolution.

2. The image recognition device according to claim 1, wherein the imager includes a pixel array in which a plurality of the imaging pixels having the same light receiving area and different exposure times are two-dimensionally arranged.

3. The image recognition device according to claim 1, wherein the imager includes a pixel array in which a plurality of the imaging pixels having the same light receiving area and having different light transmittances of color filters stacked thereon are two-dimensionally arranged.

4. The image recognition device according to claim 1, wherein the imager includes a pixel array in which a plurality of the imaging pixels having different light receiving areas are two-dimensionally arranged.

5. The image recognition device according to claim 1, wherein the imager includes
a pixel array in which a long-exposure imaging pixel, a moderate-exposure imaging pixel, and a short-exposure imaging pixel are two-dimensionally arranged.

6. The image recognition device according to claim 1, wherein the imager includes
a pixel array in which a low-sensitivity imaging pixel, a moderate-sensitivity imaging pixel, and a high-sensitivity imaging pixel are two-dimensionally arranged.

7. The image recognition device according to claim 1, wherein
in a case where the subject is recognized, the processor outputs a result of recognizing the subject and the image data to a device in a subsequent stage, and in a case where the subject is not recognized, the processor outputs information indicating that the subject is not recognized to the device in the subsequent stage.

8. The image recognition device according to claim 1, wherein
the processor recognizes the subject from the image data that are subjected to demosaicing processing.

9. The image recognition device according to claim 1, wherein
the processor recognizes the subject from the image data that are not subjected to demosaicing processing.

10. The image recognition device according to claim 1, wherein
the processor recognizes the subject from the image data input from the imager.

11. The image recognition device according to claim 1, wherein
before the subject is detected by the processor, the imager uses the imaging pixel having the first sensitivity and the imaging pixel having the second sensitivity to generate image data of an entire image captured at the second resolution,
in a case where the subject detected by the processor is a traffic light, the imager uses the imaging pixel having the first sensitivity, and in a case where the subject is a vehicle, the imager uses the imaging pixel having the second sensitivity to generate image data obtained by cutting out the subject from an image captured at the second resolution, and
the processor executes processing of recognizing the subject from the image data before detecting the subject, and executes recognition processing according to the subject based on the image data after recognizing the subject.

12. The image recognition device according to claim 5, wherein
before the subject is detected by the processor, the imager uses the long-exposure imaging pixel, the moderate-exposure imaging pixel, and the short-exposure imaging pixel to generate image data of an entire image captured at the second resolution,
in a case where the subject detected by the recognition unit is a traffic light, the imager uses the moderate-exposure imaging pixel, and in a case where the subject is a vehicle, the imager uses the short-exposure imaging pixel to generate image data obtained by cutting out the subject from an image captured at the second resolution, and the processor executes processing of recognizing the subject from the image data before detecting the subject, and executes recognition processing according to the subject based on the image data after recognizing the subject.

13. An image recognition method comprising:
capturing a plurality of images at a same exposure start timing in one frame period by using imaging pixels having different sensitivities to generate image data;
recognizing a subject from the image data;
before the subject is detected, using at least one of the imaging pixels that has a first sensitivity to generate image data of an entire image captured at a first resolution; and
after the subject is detected, using at least one of the imaging pixels that has a second sensitivity to generate image data obtained by cutting out the subject from an image captured at a second resolution, wherein
the first sensitivity is lower than the second sensitivity and the first resolution is lower than the second resolution.

14. A non-transitory computer readable medium storing program code for image recognition, the program code being executable by a processor to perform operations comprising:
capturing a plurality of images at a same exposure start timing in one frame period by using imaging pixels having different sensitivities to generate image data;
recognizing a subject from the image data;
before the subject is detected, using at least one of the imaging pixels that has a first sensitivity to generate image data of an entire image captured at a first resolution; and
after the subject is detected, using at least one of the imaging pixels that has a second sensitivity to generate image data obtained by cutting out the subject from an image captured at a second resolution, wherein
the first sensitivity is lower than the second sensitivity and the first resolution is lower than the second resolution.

15. The non-transitory computer readable medium according to claim 14, wherein the operations further comprise:
in a case where the subject is recognized, outputting a result of recognizing the subject and the image data to a device in a subsequent stage, and in a case where the subject is not recognized, outputting information indicating that the subject is not recognized to the device in the subsequent stage.

16. The non-transitory computer readable medium according to claim 14, wherein the operations further comprise:
recognizing the subject from the image data that are subjected to demosaicing processing.

17. The non-transitory computer readable medium according to claim 14, wherein the operations further comprise:
recognizing the subject from the image data that are not subjected to demosaicing processing.

18. The non-transitory computer readable medium according to claim 14, wherein the operations further comprise:
recognizing the subject from the image data input from the imager.

19. The non-transitory computer readable medium according to claim 14, wherein the operations further comprise:
before the subject is detected, using the imaging pixel having the first sensitivity and the imaging pixel having the second sensitivity to generate image data of an entire image captured at the second resolution, in a case where the subject detected is a traffic light, using the imaging pixel having the first sensitivity, and in a case where the subject is a vehicle, using the imaging pixel having the second sensitivity to generate image data obtained by cutting out the subject from an image captured at the second resolution, and executing processing of recognizing the subject from the image data before detecting the subject, and executing recognition processing according to the subject based on the image data after recognizing the subject.

* * * * *